United States Patent
Mehrvar

(10) Patent No.: US 9,955,243 B2
(45) Date of Patent: Apr. 24, 2018

(54) SCALABLE SILICON PHOTONIC SWITCHING ARCHITECTURES FOR OPTICAL NETWORKS

(71) Applicant: Huawei Technologies Co., Ltd., Shenzhen (CN)

(72) Inventor: Hamid Mehrvar, Kanata (CA)

(73) Assignee: Huawei Technologies Co., LTD, Shenzhen (CN)

( * ) Notice: Subject to any disclaimer, the term of this patent is extended or adjusted under 35 U.S.C. 154(b) by 0 days.

(21) Appl. No.: 15/347,448

(22) Filed: Nov. 9, 2016

(65) Prior Publication Data

US 2017/0064417 A1  Mar. 2, 2017

Related U.S. Application Data

(62) Division of application No. 14/289,304, filed on May 28, 2014, now Pat. No. 9,560,427.

(51) Int. Cl.
*H04Q 11/00* (2006.01)
*H04J 14/02* (2006.01)
*H04L 12/947* (2013.01)

(52) U.S. Cl.
CPC ...... *H04Q 11/0005* (2013.01); *H04J 14/0212* (2013.01); *H04L 49/25* (2013.01);
(Continued)

(58) Field of Classification Search
CPC ... H04Q 2011/0015; H04Q 2011/0054; H04Q 2011/0058
See application file for complete search history.

(56) References Cited

U.S. PATENT DOCUMENTS 5,077,483 A * 12/1991 Cloonan ............ H04Q 11/0005
385/16
5,524,154 A 6/1996 Bergland et al.
(Continued)

FOREIGN PATENT DOCUMENTS

CN 1392696 A 1/2003
CN 101437178 A 5/2009
(Continued)

OTHER PUBLICATIONS

Wikipedia definition for Benes from Jun. 20, 2013, defining m = n = 2; Wikipedia.org via https://web.archive.org/web/20130701221213/en.wikipedia.org/wiki/Clos_network.*
(Continued)

*Primary Examiner* — Nathan Cors
(74) *Attorney, Agent, or Firm* — Slater Matsil, LLP

(57) ABSTRACT

Hybrid dilated Benes photonic switching architectures employ an arrangement of two-by-one (2×1) photonic and two-by-two (2×2) photonic elements to enjoy improved cross-talk performance while maintaining moderate cell counts. A jumpsuit switch optical network node architecture comprising multiple stages may operate more efficiently than single stage switching fabrics, by enabling manipulation of connectivity in some stages to achieve load balancing over other stages. Specifically, a first stage of switching fabrics connected to input ports of the optical node may be manipulated to load balance incoming signals over a second stage of switching fabrics coupled to output ports of the optical node. Additionally, a third stage of switching fabrics connected to add ports of the optical node may be manipulated to load balance added optical signals over the second stage of switching fabrics.

20 Claims, 29 Drawing Sheets

(52) U.S. Cl.
CPC ... *H04Q 11/0003* (2013.01); *H04Q 2011/005* (2013.01); *H04Q 2011/0039* (2013.01); *H04Q 2011/0049* (2013.01); *H04Q 2011/0054* (2013.01); *H04Q 2011/0058* (2013.01)

(56) References Cited

U.S. PATENT DOCUMENTS

| | | | |
|---|---|---|---|
| 6,005,698 A | 12/1999 | Huber et al. | |
| 7,532,817 B1* | 5/2009 | Ko | H04B 10/032 |
| | | | 398/20 |
| 2002/0061155 A1 | 5/2002 | He et al. | |
| 2002/0071628 A1 | 6/2002 | Zang et al. | |
| 2003/0091271 A1 | 5/2003 | Dragone | |
| 2003/0161303 A1* | 8/2003 | Mehrvar | H04L 47/24 |
| | | | 370/386 |
| 2004/0091198 A1 | 5/2004 | Graves | |
| 2008/0088348 A1 | 4/2008 | Takita | |
| 2009/0324221 A1 | 12/2009 | Neilson | |
| 2009/0324243 A1* | 12/2009 | Neilson | H04Q 11/0005 |
| | | | 398/154 |
| 2013/0108215 A1* | 5/2013 | Ticknor | G02B 6/35 |
| | | | 385/17 |
| 2014/0219657 A1* | 8/2014 | Simonneau | H04Q 11/0005 |
| | | | 398/49 |
| 2014/0328154 A1 | 11/2014 | Mehrvar et al. | |
| 2014/0334819 A1* | 11/2014 | Mehrvar | H04Q 11/0003 |
| | | | 398/51 |
| 2015/0289035 A1* | 10/2015 | Mehrvar | H04L 49/356 |
| | | | 398/51 |

FOREIGN PATENT DOCUMENTS

| | | |
|---|---|---|
| CN | 101778047 A | 7/2010 |
| EP | 1241913 A1 | 9/2002 |
| WO | 2004095874 A2 | 11/2004 |
| WO | 2013041456 A1 | 3/2013 |
| WO | 2013063543 A1 | 5/2013 |

OTHER PUBLICATIONS

Calient, "S320 Photonic Switch Getting Started Guide," Calient Technologies, Inc., 2013, 29 pages.

Qiao, C., "A Universal Analytic Model for Photonic Banyan Networks," in IEEE Transactions on Communications, vol. 46, No. 10, pp. 1381-1389, Oct. 1998.

* cited by examiner

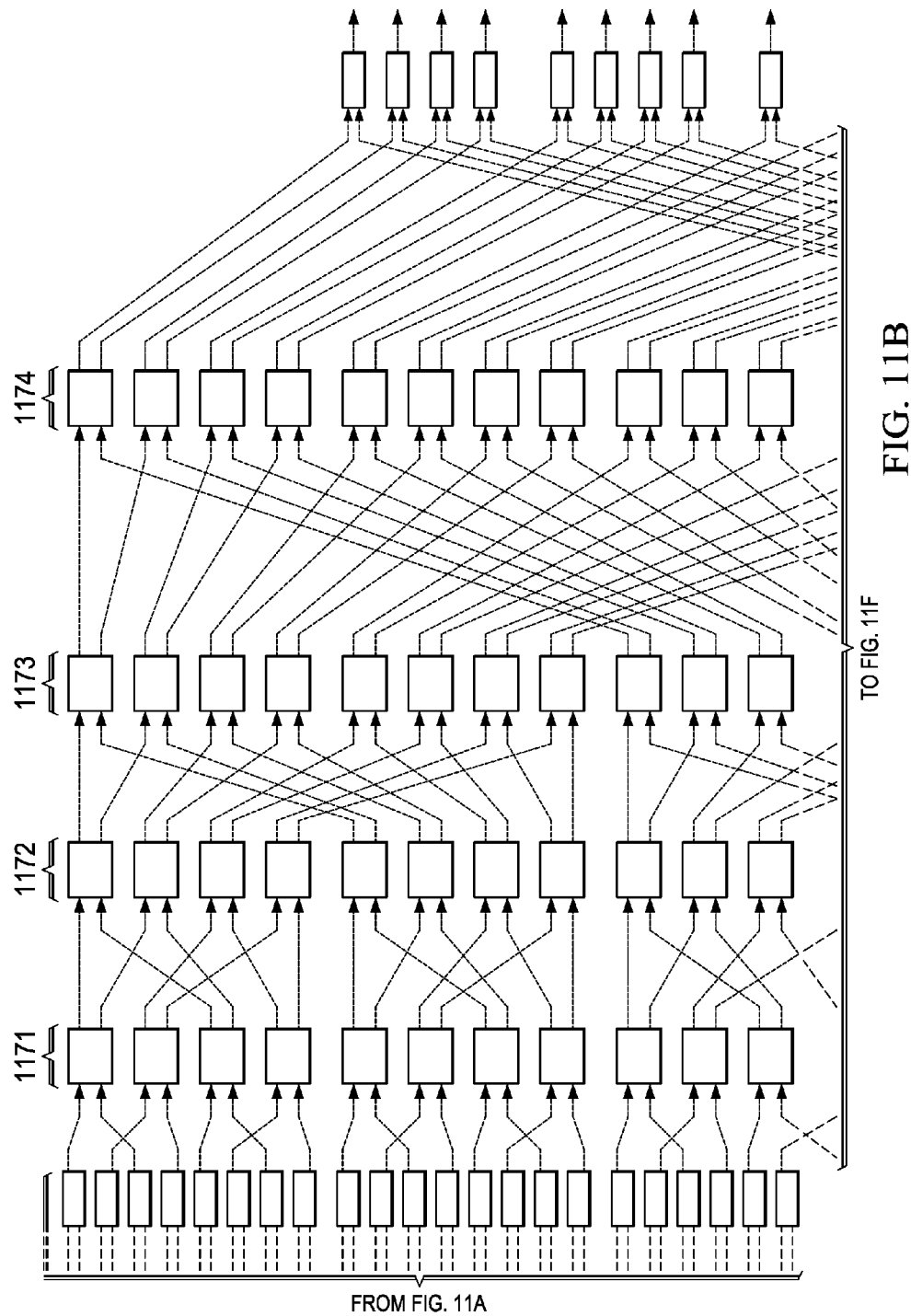

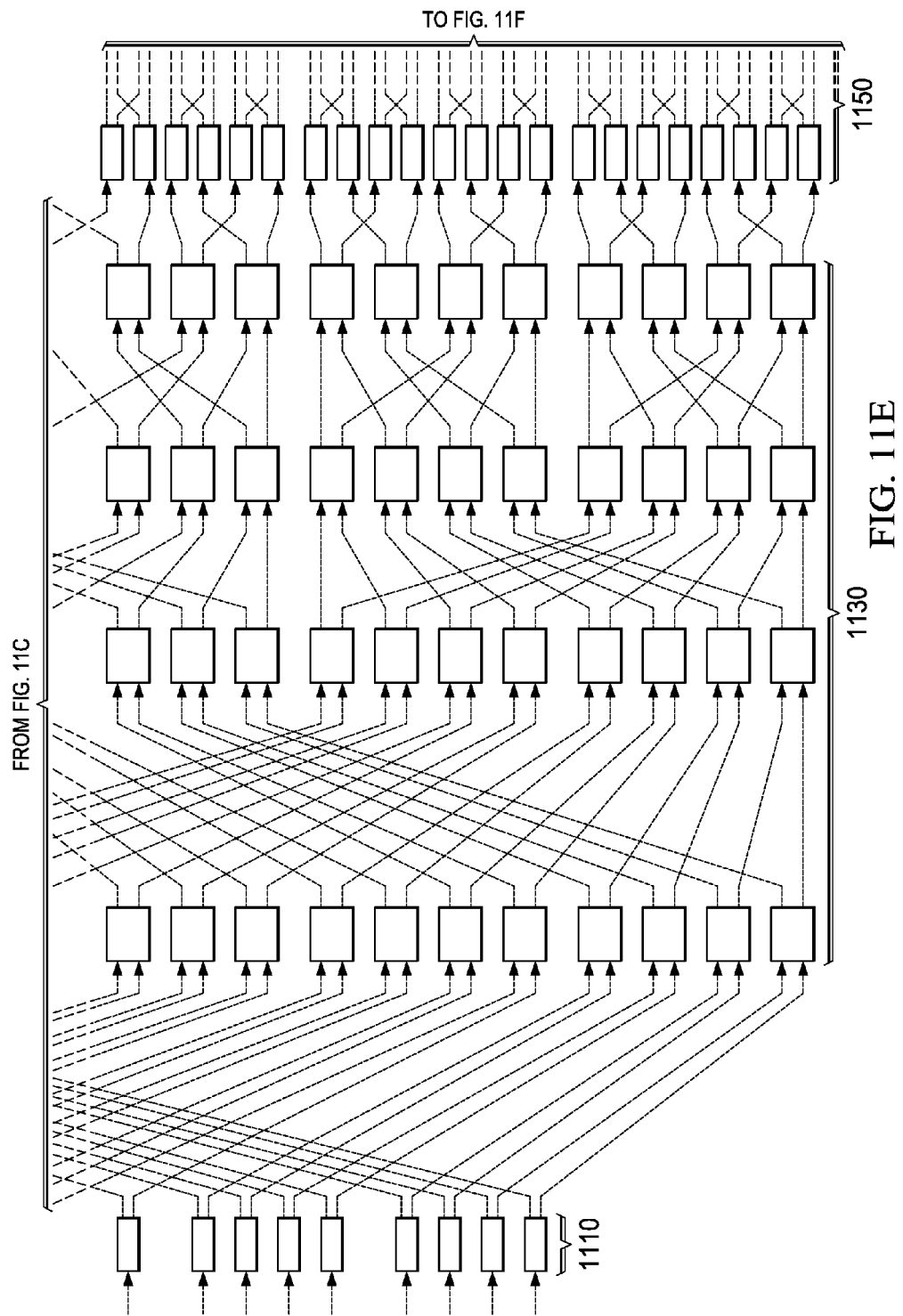

SCALABLE SILICON PHOTONIC SWITCHING ARCHITECTURES FOR OPTICAL NETWORKS

This patent application is a divisional of U.S. patent application Ser. No. 14/289,304 filed on May 28, 2014 and entitled "Scalable Silicon Photonic Switching Architectures for Optical Networks," which is incorporated by reference herein as if reproduced in its entirety.

TECHNICAL FIELD

The present invention relates generally to managing the allocation of resources in a network, and in particular embodiments, to scalable silicon photonic switching architectures for optical networks.

BACKGROUND

Present day transparent optical nodes are primarily reconfigurable optical add-drop multiplexers (ROADMs) that consist of vast numbers of parallel mini-switches or wavelength selective switches (WSSs). Such designs may be incapable of satisfying the growing demands of network access providers, and therefore large scale optical nodes are needed to handle the massive traffic loading of next generation optical networks. For example, future optical network nodes may be required to switch in the neighborhood of four hundred incoming wavelengths over four hundred outgoing wavelengths (400×400) to satisfy the bandwidth, directional, and add/drop demands of tomorrows optical metro and long-haul networks.

It may be some time before photonic integrated circuits (PICs) technology are realistically capable of providing such a large capacity at a reasonable cost. Moreover, Micro-Electromechanical Systems (MEMS) may be unsuitable from a practical standpoint, due to their being bulky, inflexible, costly, and (at times) unreliable. Accordingly, in the near-term, next-generation optical network nodes will likely be manufactured using N×N photonic switching fabrics to interconnect inputs and outputs.

SUMMARY OF THE INVENTION

Technical advantages are generally achieved, by embodiments of this disclosure which describe scalable silicon photonic switching architectures for optical networks.

In accordance with an embodiment, a switching fabric characterized by a hybrid dilated Benes photonic switching architecture is provided. The switching fabric comprises a first number of input ports (N input ports), a first number of output ports (N output ports), and a plurality of photonic elements coupled in-between the N input ports and the N output ports. The photonic elements are arranged into a photonic switching architecture for switching between the N input ports and the N output ports, wherein the photonic switching architecture includes a first outer-most switching column comprising N rows of one-by-two (1×2) photonic elements coupled to the N input ports, a second outermost column comprising N rows of two-by-one (2×1) photonic elements coupled to the N output ports, two intermediate switching stages each of which including at least one column comprising N rows of two-by-two (2×2) switching elements, and a central switching column comprising N×2 rows of one-by-two (1×2) photonic elements coupled to two-by-one (2×1) photonic elements.

In accordance with another embodiment, an optical network node is provided. In this example, the optical network node comprises a plurality of input transit ports configured to receive incoming optical signals, a plurality of output transit ports configured to forward outgoing optical signals to next hop nodes, a first switching stage coupled to the plurality of input transit ports, and a second switching stage interconnecting the first plurality of switching fabrics with the plurality of output transit ports. The first switching stage includes a first plurality of switching fabrics, and the second switching stage includes a second plurality of switching fabrics. The optical network node further comprises a control plane configured to manipulate the first plurality of switching fabrics to load balance the incoming optical signals over the second plurality of switching fabrics.

In accordance with yet another embodiment, a method for achieving load balancing in an optical node of an optical network is provided. In this example, the method comprises receiving incoming optical signals over input transit ports of the optical node. The optical node includes a first stage of switching fabrics coupled to the input transit ports, a second stage of switching fabrics interconnecting the first stage of switching fabrics with output transit ports of the optical node, and a third stage of switching fabrics interconnecting the second stage of switching fabrics with drop ports of the optical node. The method further comprises classifying at least some of the incoming optical signals as dropped optical signals and manipulating switching fabrics in the first stage of switching fabrics to load balance the dropped signals over the second stage of switching fabrics. An apparatus for performing this method is also provided.

In accordance with yet another embodiment, a method for achieving load balancing in an optical node of an optical network is provided. In this example, the method includes receiving incoming optical signals over input transit ports of the optical node. The optical node includes at least a first stage of switching fabrics coupled to the input transit ports, a second stage of switching fabrics, and a fourth stage of switching fabrics coupled to output transit ports of the optical node. The second stage of switching fabrics interconnects the first stage of switching fabrics to the fourth stage of switching fabrics. The method further comprises classifying at least some of the incoming optical signals as transit optical signals configured to pass through the optical node, and manipulate switching fabrics in the first stage of switching fabrics to load balance the transit optical signals over the second stage of switching fabrics. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which:

FIGS. 11A-11F illustrate a diagram of an embodiment thirty-two-by-thirty-two hybrid EDB switching fabric;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
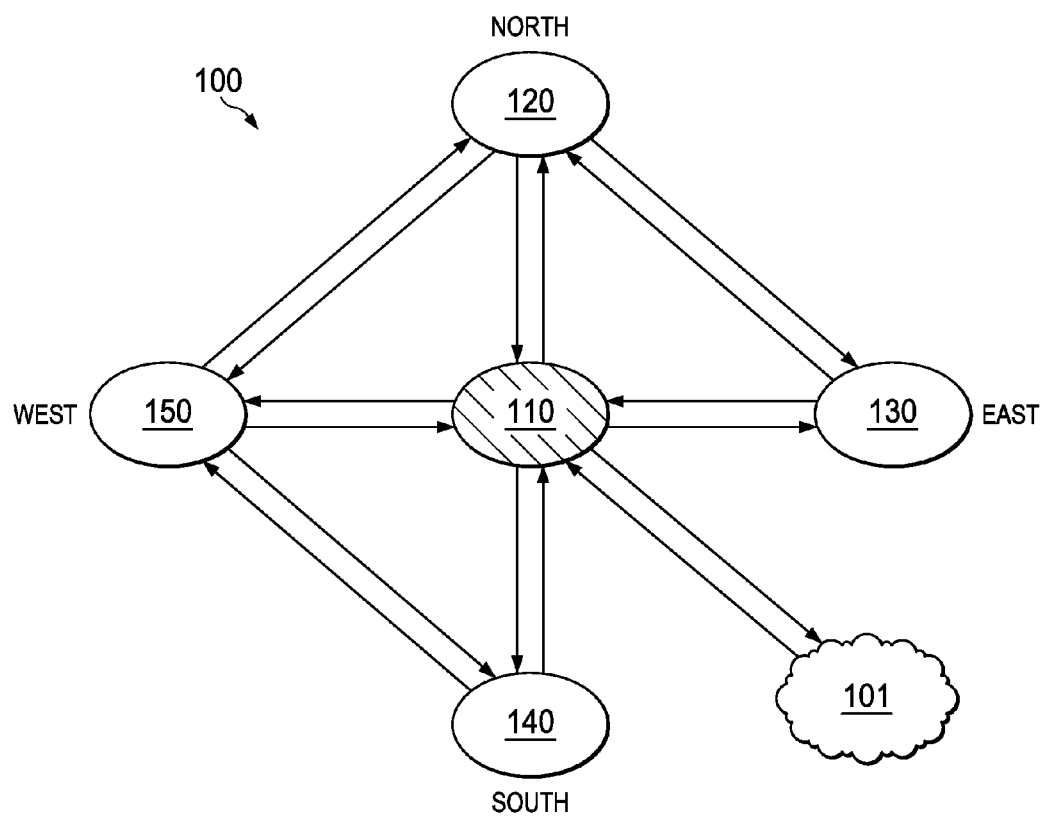
FIG. 1 illustrates a diagram of an embodiment optical network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Next-generation N×N photonic switching fabrics will include thousands of passive silicon photonic elements arranged in architectures that allow the input ports to be switched to the output ports, as well as to accommodate the add/drop requirements at the switching locations. Attenuation over the AON is directly related to the number of photonic element layers, as each layer adds another stage of parasitic insertion loss to the switching path of the optical signals. Moreover, the individual photonic elements exhibit non-ideal performance such that at least a portion of the signal leaks across to the non-selected output. This signal leakage accumulates throughout the switch fabric and ultimately leads to cross-talk noise amongst the various output ports in the N×N photonic switch fabric, which degrades network performance.

Different photonic switching architectures require different number of switching cells and exhibit different cross-talk performance and attenuation losses. For example, Benes switching fabric offer both low cell count and attenuation loss, but suffer from relatively high levels of first order cross-talk which impact signal to noise ratio (SNR) especially when the signals have the same wavelength. Conversely, enhanced Dilated Banyan (EDB) architectures offer excellent cross-talk performance, but require comparatively high cell counts and relatively moderate attenuation loss. Given EDB has relatively large numbers of cells, it is possible to use the unused cells to further improve the crosstalk performance. Examples of such suppression algorithms are described in U.S. Non-Provisional application Ser. No. 14/018,273 filed on Sep. 4, 2013 and entitled "Method for cross-talk and Power Optimization in Silicon Photonic Based Switch Matrices," which is incorporated herein by reference as if reproduced in its entirety. An N×N Dilated Benes switching fabrics may be constructed by two stacked N×N Benes architectures connected to N first layer 1×2 and N last layer 2×1 cells. Dilated Benes offers moderate cross-talk performance with less cell count than EDB. Both Benes and Dilated Benes may have difficulty providing adequate cross-talk suppression without implementing intelligent suppression algorithms. Accordingly, a photonic switching architecture capable of providing better cross-talk performance than Dilated Benes architectures without significantly increasing the cell count are desired.

Aspects of this disclosure provide a hybrid dilated Benes photonic switching architectures that include an arrangement of two-by-one (2×1) photonic and two-by-two (2×2) photonic elements. Embodiment switching fabrics that utilize the hybrid dilated Benes photonic switching architectures provided by this disclosure will enjoy better cross-talk performance than conventional Dilated Benes fabrics, while using fewer cells than Enhanced Dilated Banyan switching fabrics. Aspects of this disclosure further provide an optical network node architecture for next-generation networks that manipulates the connectivity of a first stage to achieve load balancing over a second stage. These and other aspects are described in greater detail below.

FIG. 1 illustrates an embodiment optical network 100 comprising an optical network nodes 110 connected to a plurality of optical network nodes 120-150, as well as to a local network 101. As shown, the optical network node 110 sends and receives transit optical signals to/from each of the optical network nodes 120-140. Moreover, the optical network node no sends dropped optical signals to the local network 101, and receives new optical signals from the local network 101. Dropped optical signals may refer to optical signals that are exiting the optical network 100, as may occur when the data carried by the signal destined for a location in (or connected to) the local network 101. New optical signals may refer to optical signals that are entering the optical network 100, as may occur when the data carried by the signal originates from a source located in (or connected to) the local network 101. Additionally, optical signals may be dropped/added when data is transitioned from one optical wavelength to another optical wavelength.

Figure 2:
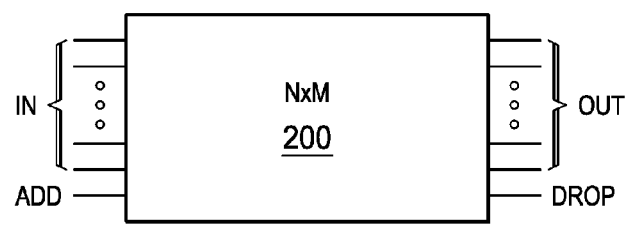
FIG. 2 illustrates a block diagram of an embodiment optical network node.

FIG. 2 illustrates a block diagram of an embodiment optical network node 200 having N×N ports. The number of ports may be affected by the number of nodes/directions the optical network node 200 communicates optical transit signals with, by the bandwidth (e.g., number of wavelengths) on each interconnection, and by the number of add/drop signals. It is likely that next-generation optical network nodes will need to switch in the neighborhood of four hundred incoming wavelengths over four hundred outgoing wavelengths (400×400) to satisfy the bandwidth, directional, and add/drop demands of tomorrows metro and core optical networks.

Figure 3A:
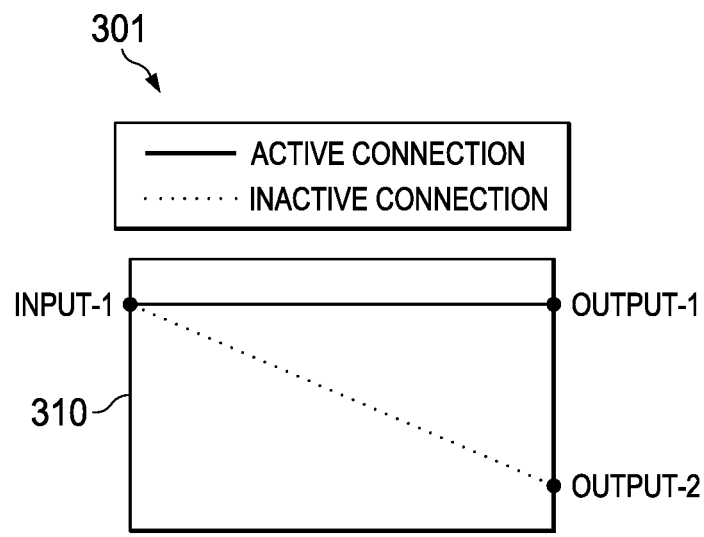
FIGS. 3A-3B illustrate diagrams of a one-by-two photonic element.
Figure 3B:
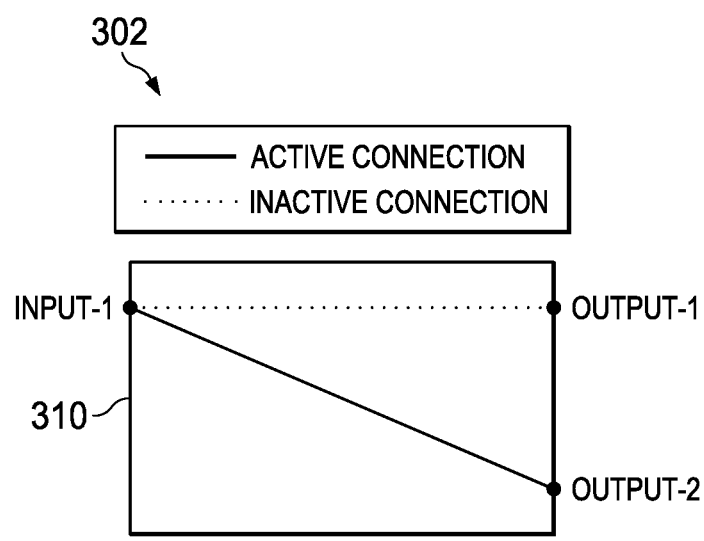
Figure 4A:
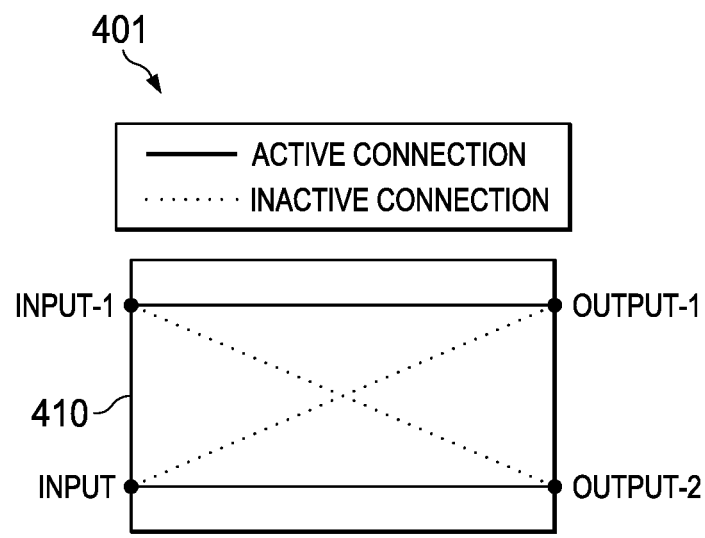
FIGS. 4A-4B illustrate diagrams of a two-by-two photonic element.
Figure 4B:
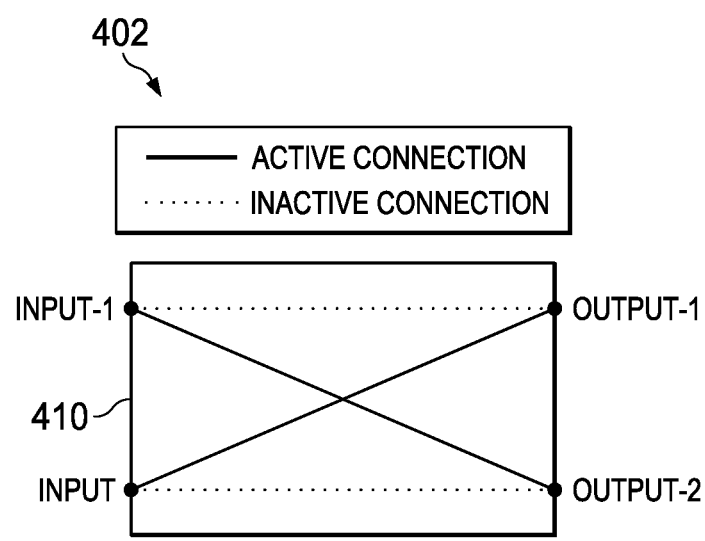

Optical network nodes generally include switching fabrics of interconnected photonic elements to achieve optical signal switching. The photonic elements may include a variety of port configurations, including one-by-two (1×2) and two-by-two (2×2) configurations. FIG. 3A illustrates a one-by-two photonic element 310 in a bar configuration 301, where the input port (input-1) is connected to the first output port (output-1). FIG. 3B illustrates the one-by-two photonic element 310 in a cross configuration 302, where the input port (input-1) is connected to the second output port (output-2). FIGS. 4A-4B illustrate embodiment switching configurations 401, 402 for a two-by-two photonic element 410. FIG. 4A illustrates the two-by-two photonic element 410 in a bar configuration 401, where the first input port (input-1) is connected to the first output port (output-1) and the second input port (input-2) is connected to the second output port (output-2). FIG. 4B illustrates the two-by-two photonic element 410 in a cross configuration 402, where the first input port (input-1) is connected to the second output port (output-2) and the second input port (input-2) is connected to the first output port (output-1).

Groups of photonic elements may be arranged to form a photonic switching fabric. Switching fabrics composed of one-by-two photonic elements may offer lower cross-talk than switching fabrics composed of two-by-two photonic elements.

Figure 5A:
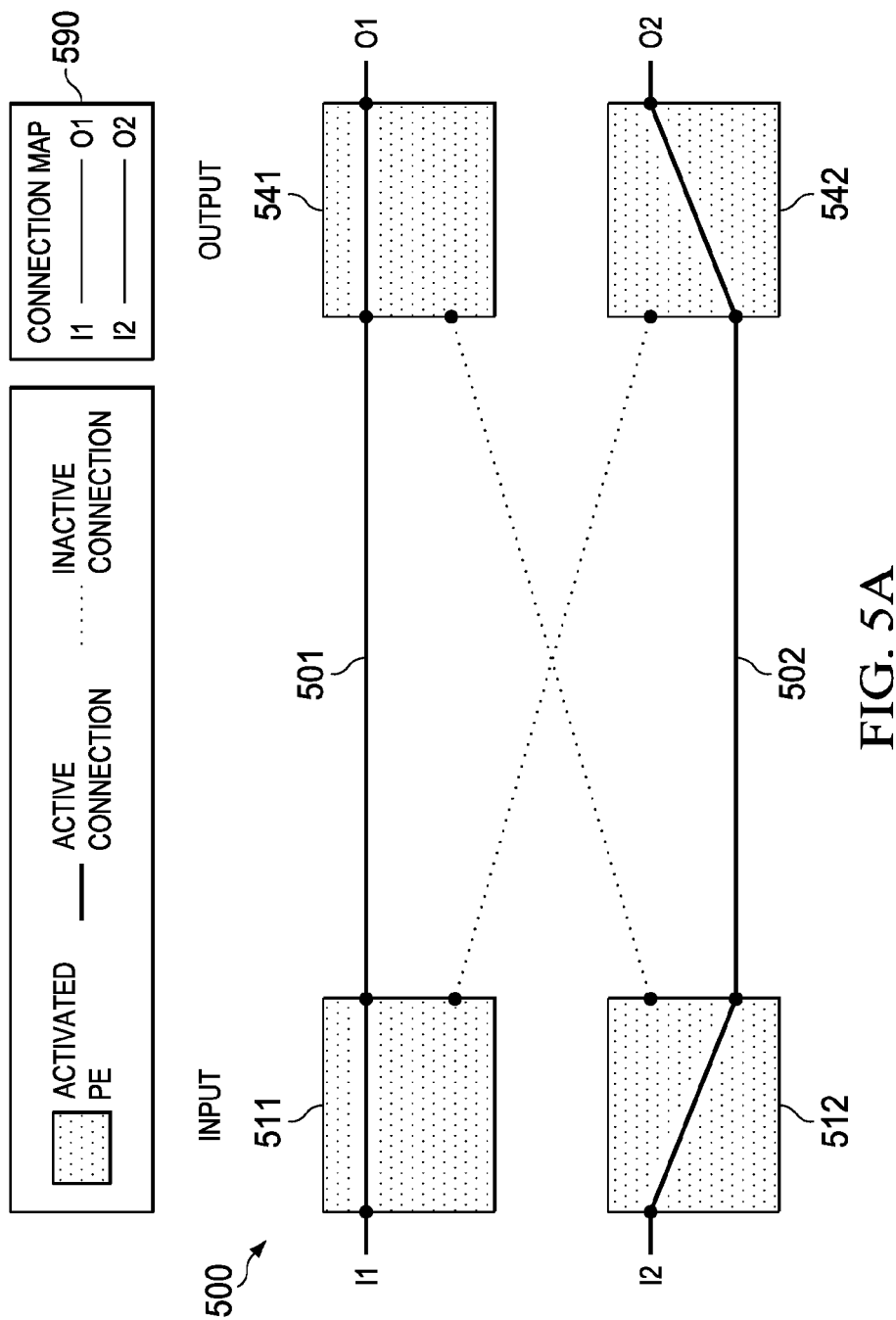
FIGS. 5A-5B illustrate diagrams of a two-by-two enhanced Dilated Banyan (EDB) switching fabric.

FIG. 5A illustrates a photonic switching fabric 500 comprising a first input port ($I_1$), second input port ($I_2$), first output port ($O_1$), a second output port ($O_2$), and a plurality of photonic elements 511-542. The photonic elements are arranged in a first stage of photonic elements 511, 512, and a second stage of photonic elements 541, 542. As shown, a switching configuration of the photonic switching fabric 500 is defined by a connection map 590, which specifies that $I_1$ is connected to $O_1$ and $I_2$ is connected to $O_2$. To achieve this switching configuration, photonic elements 511 and 541 are activated to form the active connection 501 between $I_1$ and $O_1$, while photonic elements 512 and 542 are activated to form the active connection 502 between $I_2$ and $O_2$.

Figure 5B:
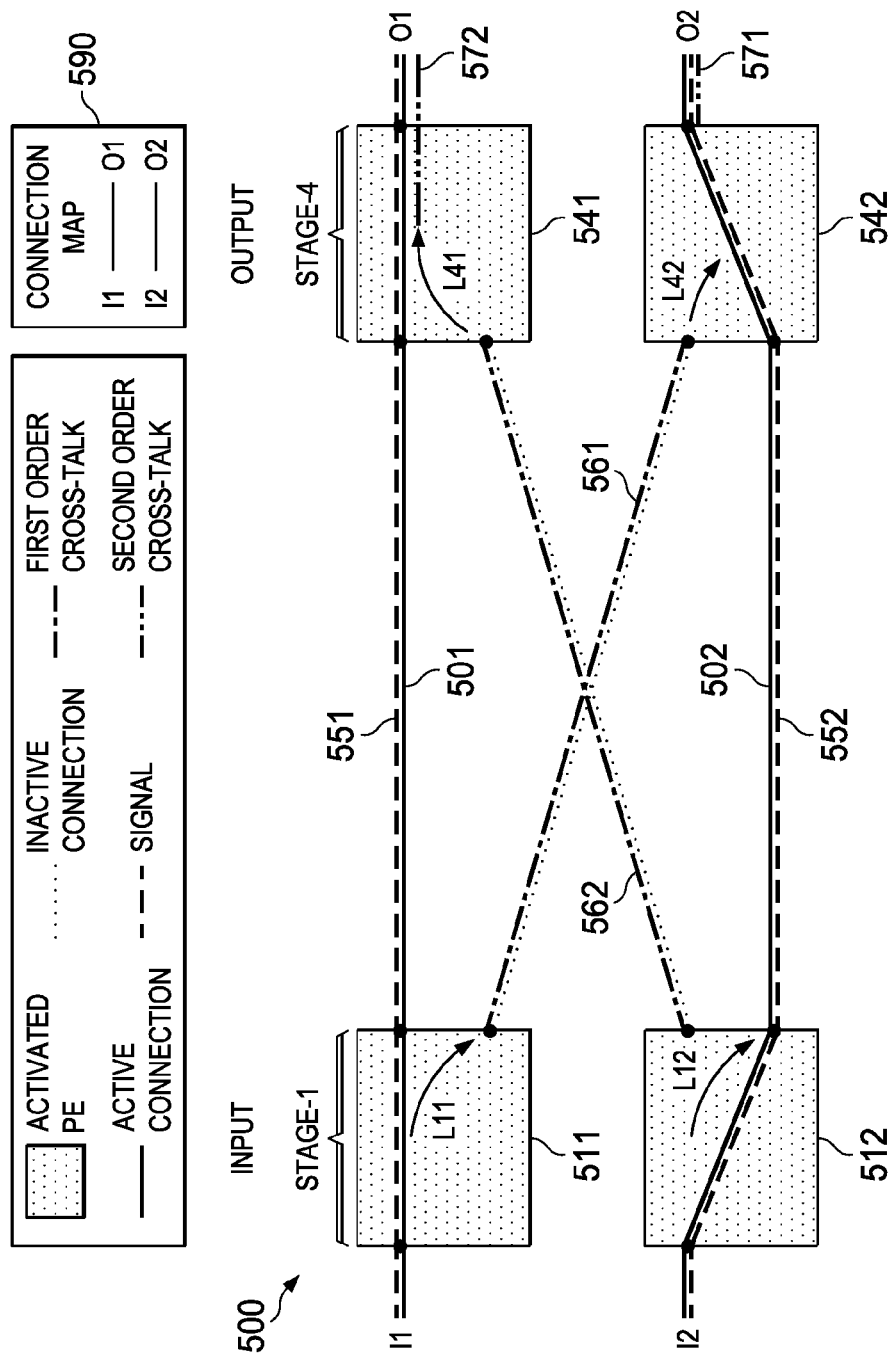

FIG. 5B illustrates how signals 551, 552 are propagated from the input ports to the output ports over the active connections 501 and 502. Notably, first stage of photonic elements 511, 512 have an extinction ratio that allows a portion ($L_{11}$, $L_{12}$) of the signals 551, 552 to leak across the outputs of the photonic elements, thereby producing first order cross-talk signals 561, 562. As shown, first order cross-talk signals 561, 562 propagate to the second stage of photonic elements 541, 542. The second stage of photonic elements 541, 542 also have an extinction ratio that allows a portion ($L_{41}$, $L_{42}$) of the first order cross-talk signals 561, 562 to leak across to the inputs, thereby forming second order cross-talk signals 571, 572. Accordingly, the output signal of $O_1$ includes the signal 551 as well as a second order cross-talk signal 572, while the output of $O_2$ includes the signal 552 as well as a second order cross-talk signal 571.

Switching fabrics composed of two-by-two photonic elements may use fewer elements than switching fabrics composed of one-by-two photonic elements, but may offer worse cross-talk suppression.

Figure 6A:
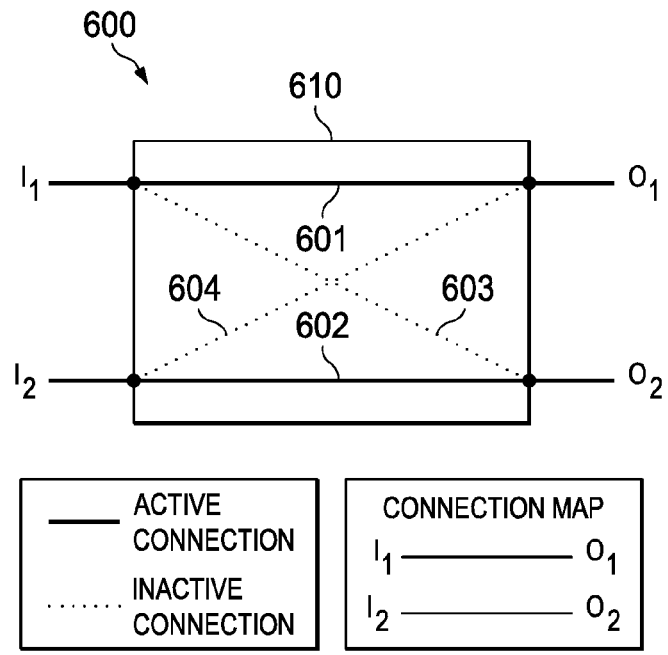
FIGS. 6A-6B illustrate diagrams of a two-by-two Benes switching fabric.
Figure 6B:
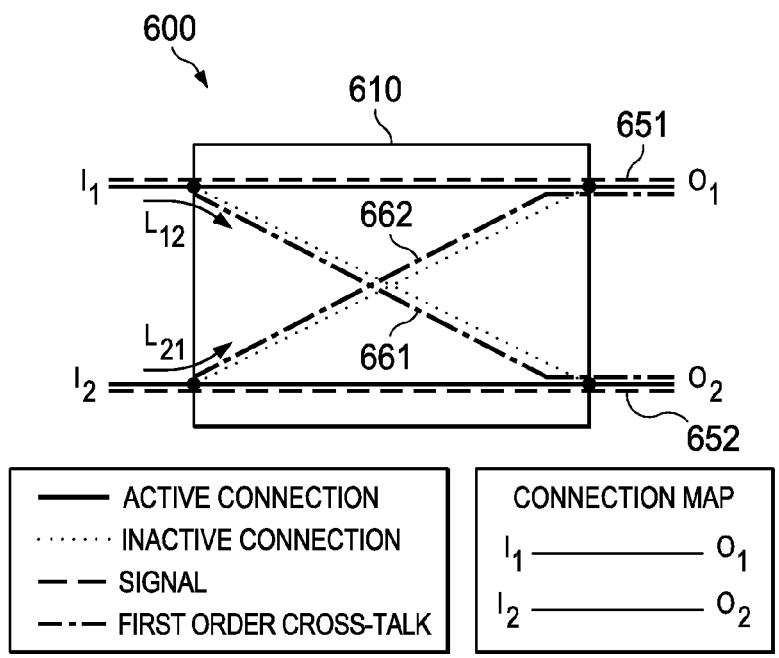

FIG. 6A illustrates a switching fabric 600 that includes a two-by-two photonic element 610 in a bar configuration to form the active connections 601 and 602, as well as inactive connections 603, 604. FIG. 6B illustrates how signals 651, 652 are transferred from the input ports ($I_1$, $I_2$) to the output ports ($O_1$, $O_2$) over the active connections 601 and 602 depicted in FIG. 6A. Notably, the two-by-two photonic element 610 has an extinction ratio that allows a portion ($L_{12}$, $L_{21}$) of the signals 651, 652 to leak across the outputs of the photonic elements, thereby producing first order cross-talk signals 661, 662. The first order cross-talk signals 661, 662 propagate over the inactive connections 603, 604 to the output ports ($O_1$, $O_2$), where the first order cross-talk signals 661, 662 are added to the signals 652, 651 (respectively). Accordingly, the output signal of $O_1$ includes the signal 651 as well as the first order cross-talk signal 662, while the output of $O_2$ includes the signal 652 as well as the first order cross-talk signal 661.

Figure 7:
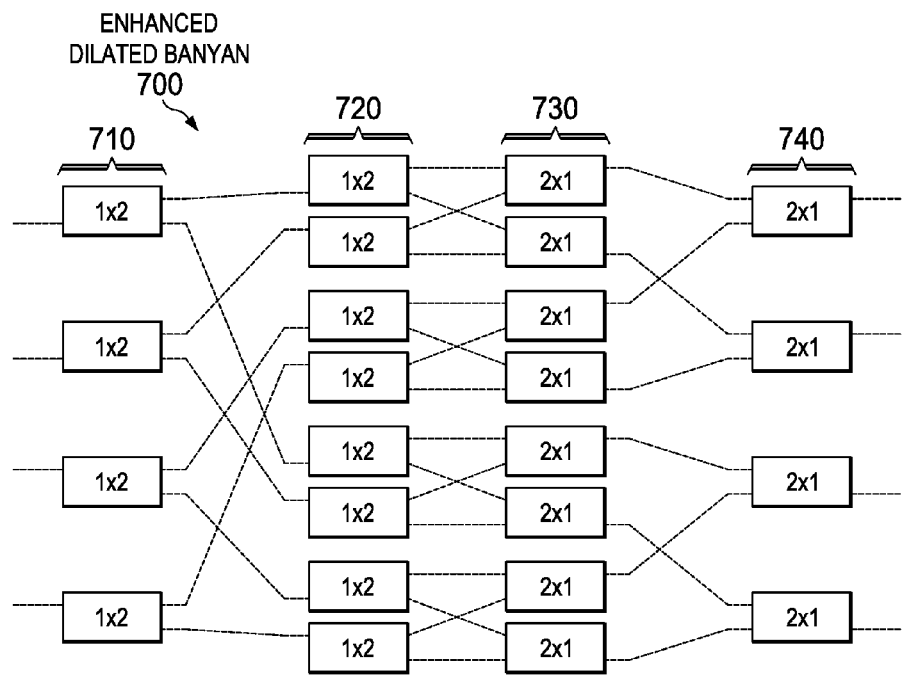
FIG. 7 illustrates a diagram of a conventional four-by-four Enhanced Dilated Banyan (EDB) switching fabric.

FIG. 7 illustrates a traditional four-by-four Enhanced Dilated Banyan (EDB) switching fabric 700 composed of four stages 710, 720, 730, and 740 of one-by-two photonic elements. The 2×2 Benes network architecture can be used to recursively construct an N×N Benes network using inverse multiplexing. For example, an N×N Benes network may consist of two N/2×N/2 Benes sub-networks, which may consist of two N/4×N/4 sub-networks. This can continue until switches of size 2×2 connected to the inputs of the two sub-networks, and N/2 switches of size 2×2 connected to the outputs of the two sub-networks.

Figure 8:
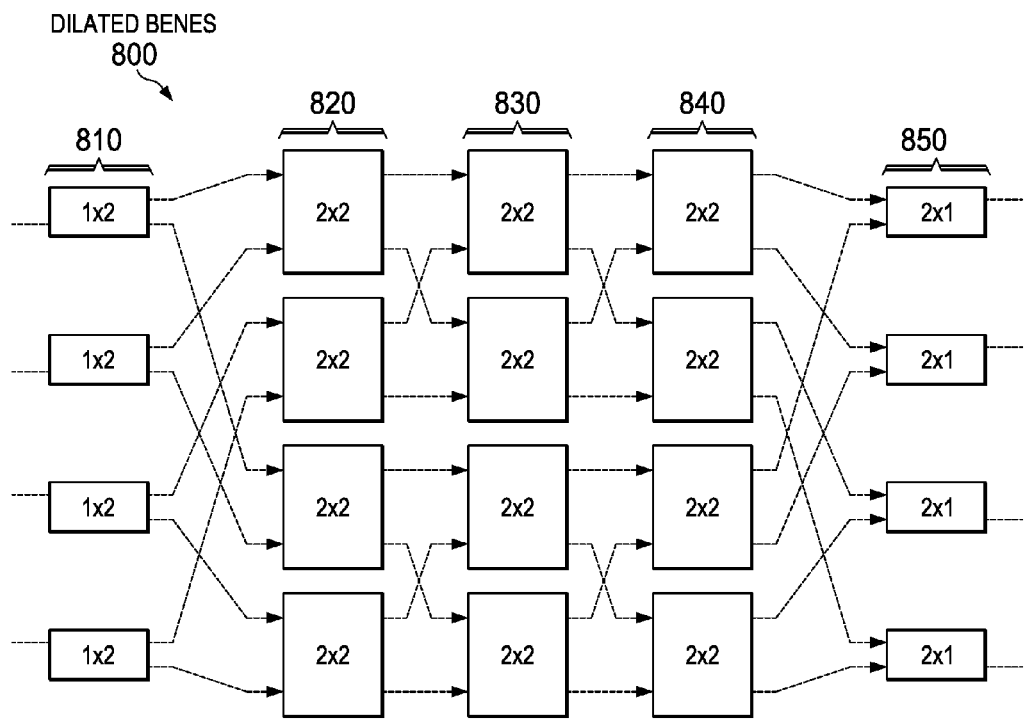
FIG. 8 illustrates a diagram of a conventional four-by-four dilated Benes switching fabric.

FIG. 8 illustrates a traditional four-by-four Dilated Benes switching fabric 800 composed of two stages 810, 850 of one-by-two photonic elements and three stages of 820, 830, 840 of two-by-two photonic elements that together form two separate four-by-four Benes switching fabric. Notably, the traditional four-by-four dilated switching fabric Boo includes fewer switching elements than the traditional four-by-four EDB switching fabric 700, while the traditional four-by-four EDB switching fabric 700 provides improved cross-talk performance.

Figure 9:
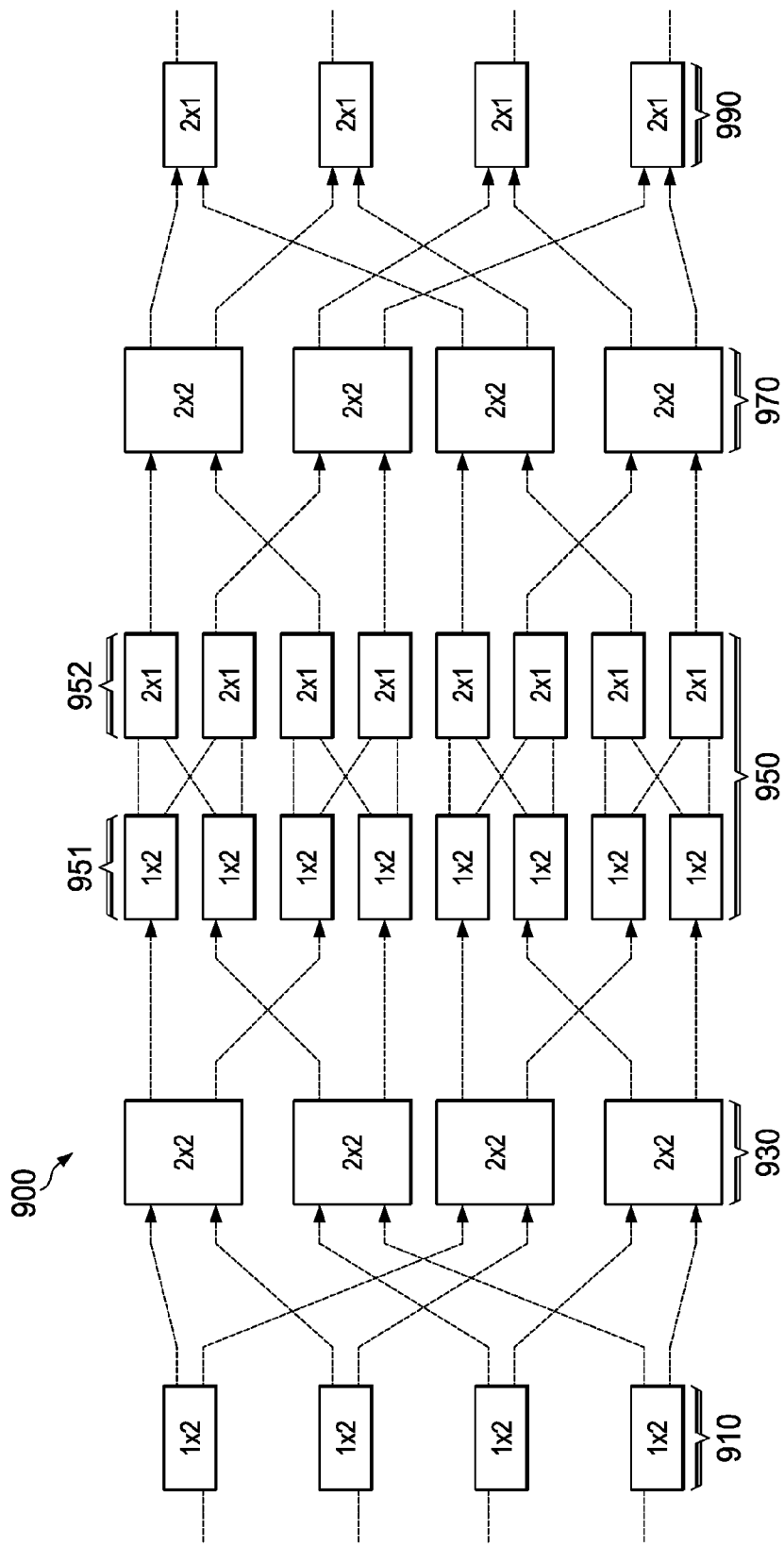
FIG. 9 illustrates a diagram of an embodiment four-by-four hybrid EDB switching fabric.

FIG. 9 illustrates an embodiment four-by-four hybrid dilated Benes switching fabric 900. As shown, the four-by-four hybrid dilated Benes switching fabric 900 includes an outermost column 910 of one-by-two photonic elements, two intermediate switching stages 930, 970 of two-by-two photonic elements, a center switching column 950 of one-by-two photonic elements coupled to two-by-one photonic elements, and an outermost column 990 of two-by-one switching elements. Advantageously, the embodiment four-by-four hybrid dilated Benes switching fabric 900 provides better crossed talk performance than the traditional four-by-four dilated Benes switching fabric 800, with fewer cells than the traditional four-by-four EDB fabric 700.

Figure 10:
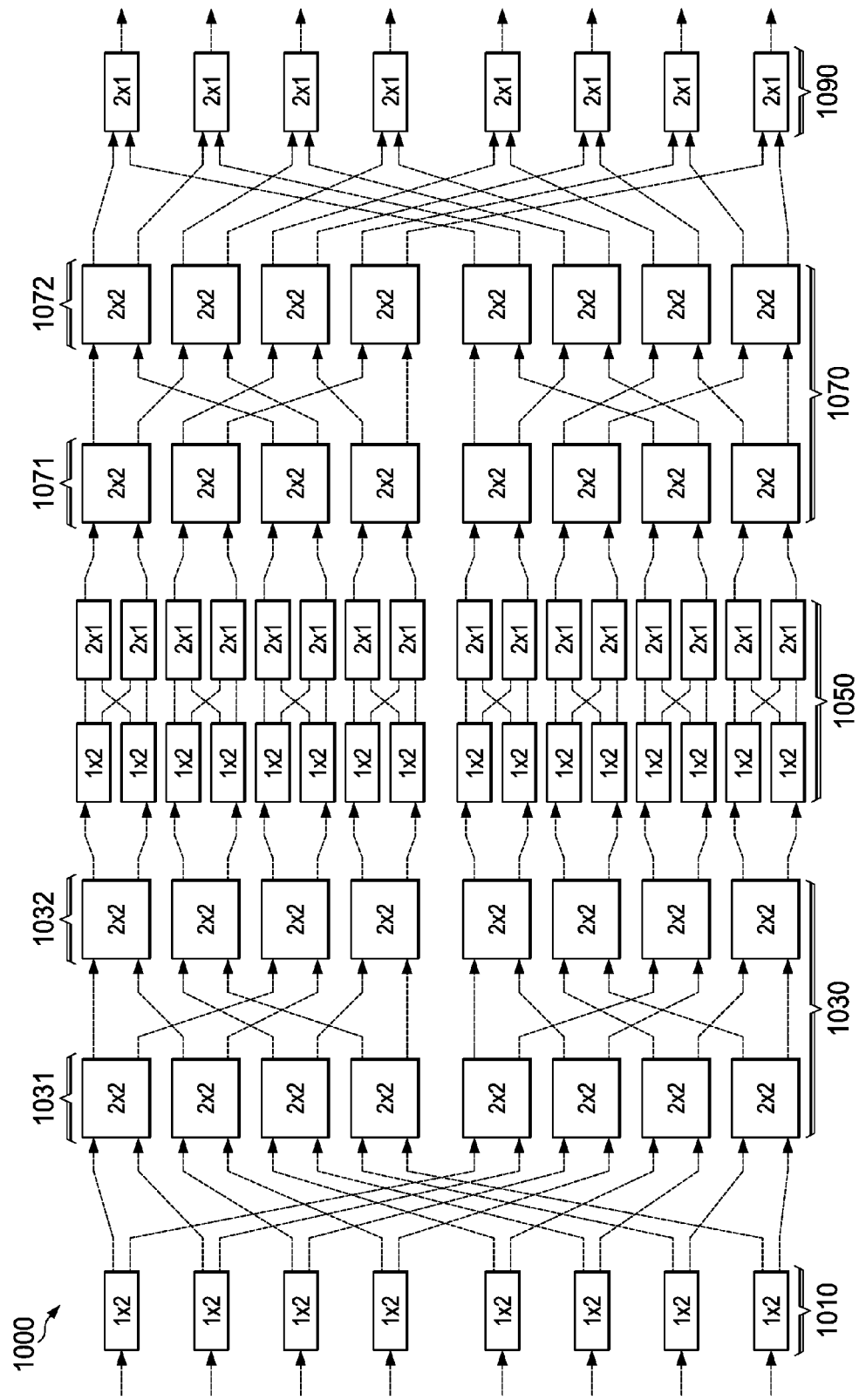
FIG. 10 illustrates a diagram of an embodiment eight-by-eight hybrid EDB switching fabric.
Figure 11A:
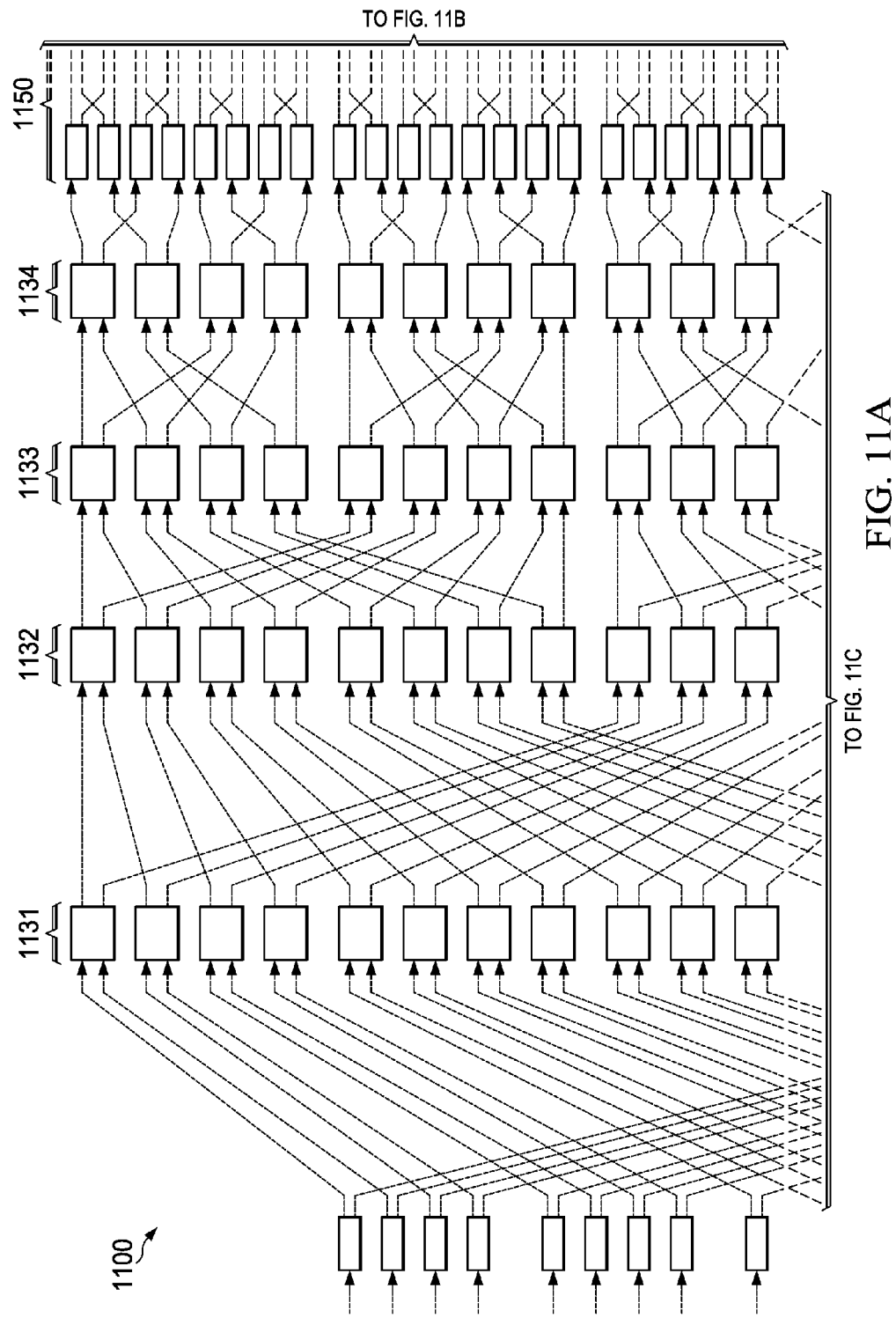
Figure 11C:
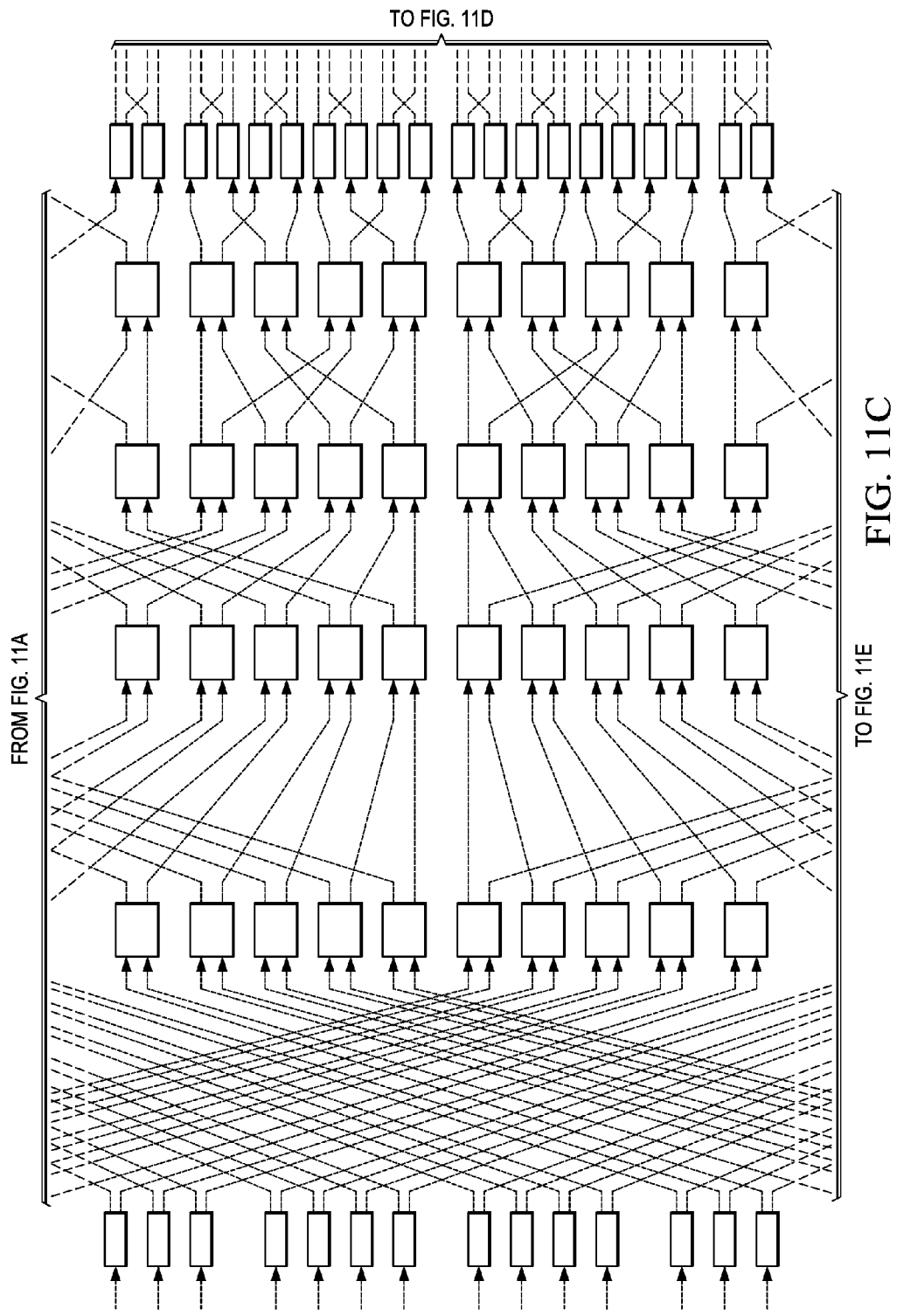
Figure 11D:
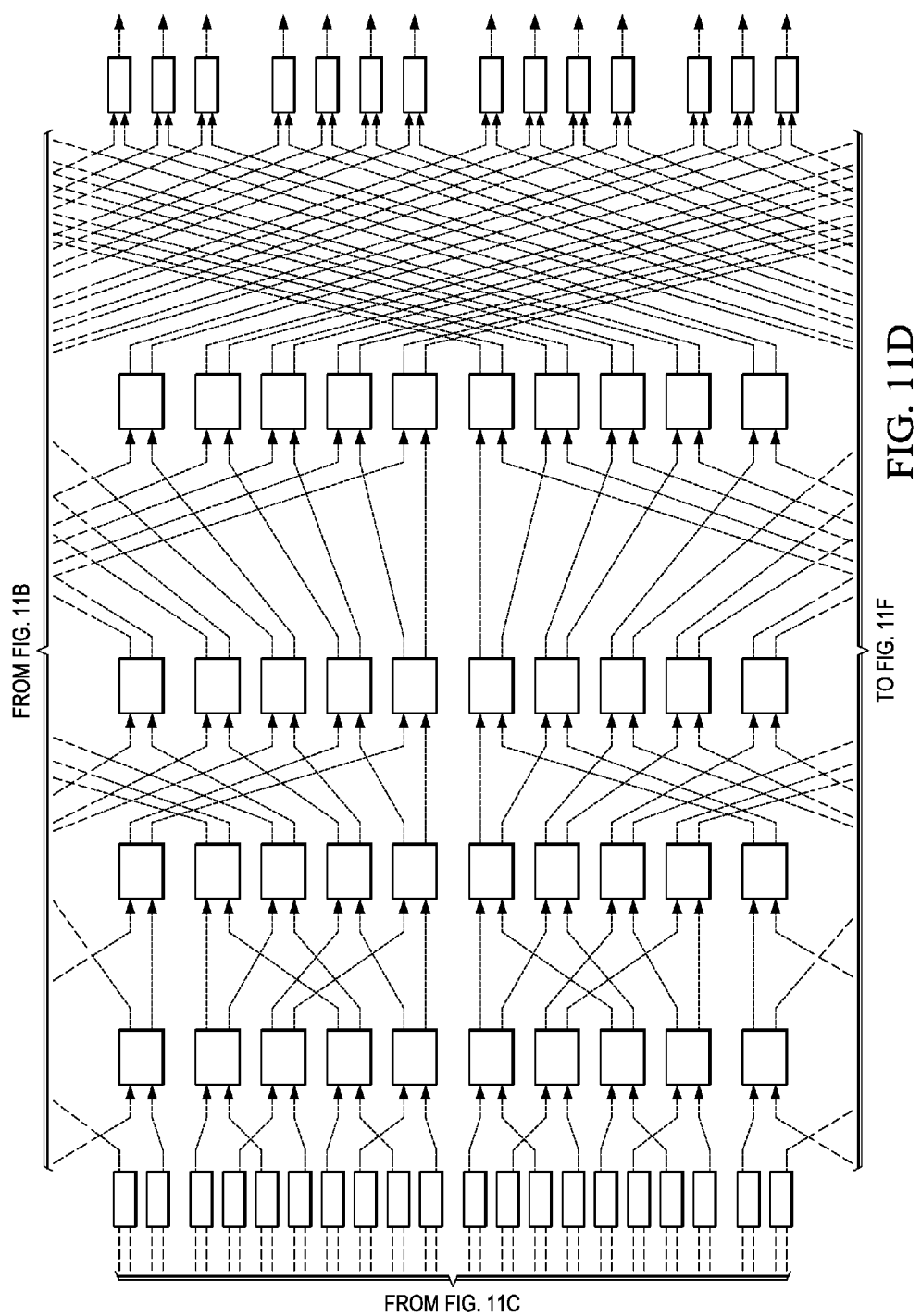
Figure 11F:
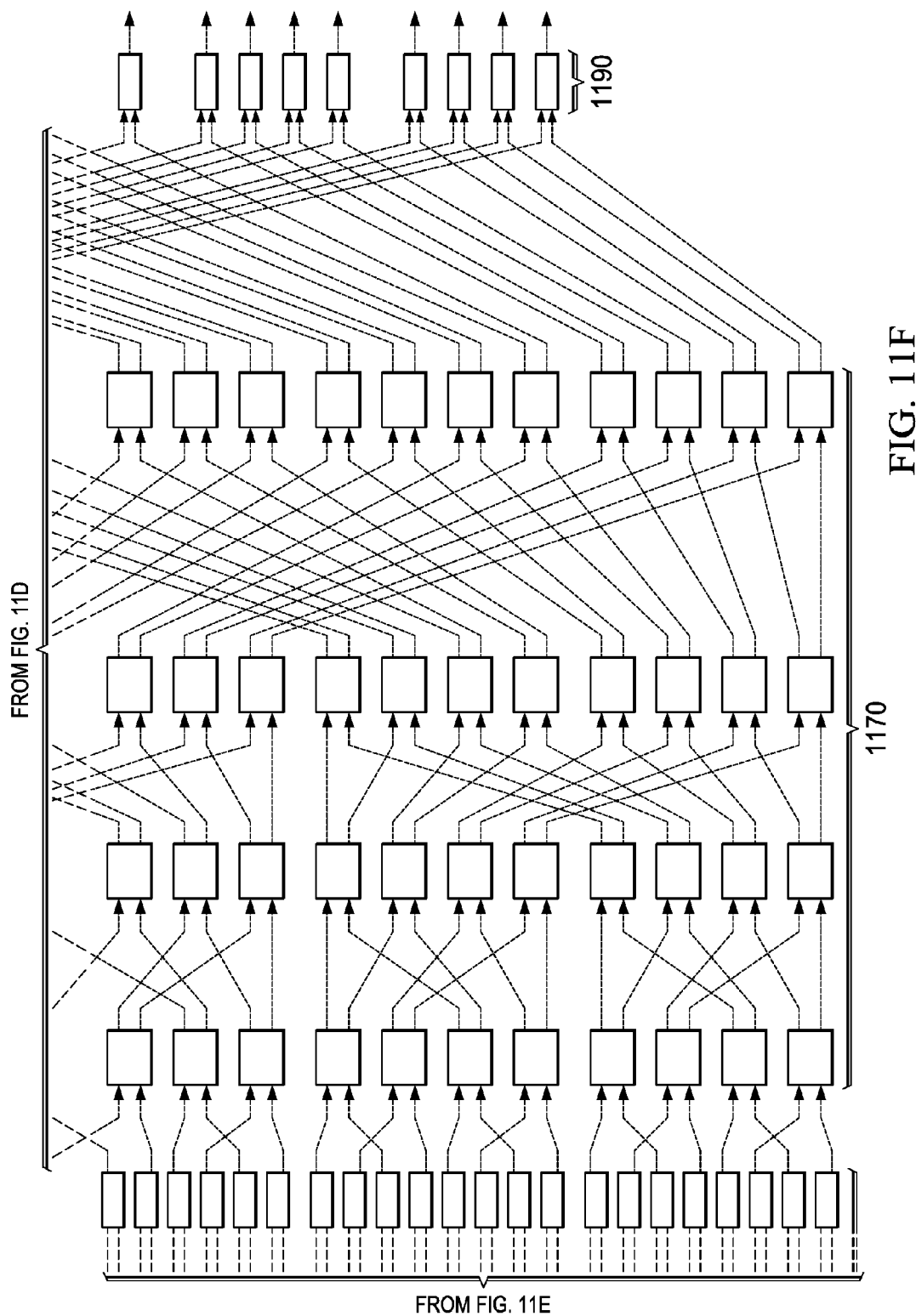

Hybrid dilated Benes switching architectures provided by this disclosure offer improved scalability over conventional EDB architectures while offering improved crosstalk performance over Benes and dilated Benes architectures. FIG. 10 illustrates an embodiment eight-by-eight hybrid dilated Benes switching fabric 1000. As shown, the eight-by-eight hybrid dilated Benes switching fabric 1000 includes an outermost column 1010 of one-by-two photonic elements, intermediate switching stages 1030, 1070 of two-by-two photonic elements, a center switching column 1050 of one-by-two photonic elements coupled to two-by-one photonic elements, and an outermost column 1090 of two-by-one switching elements. Notably, each of the intermediate switching stage 1030, 1070 includes two columns 1031-1032, 1071-1072 of two-by-two switching elements.

Hybrid dilated Benes switching architectures provided by this disclosure are capable of supporting very large fabrics. FIGS. 11A-11F illustrate an embodiment thirty-two-by-thirty-two hybrid dilated Benes switching fabric 1100. As shown, the thirty-two-by-thirty-two hybrid dilated Benes switching fabric 1100 includes an outermost column 1110 of one-by-two photonic elements, intermediate switching stages 1130, 1170 of two-by-two photonic elements, a center switching column 1150 of one-by-two photonic elements coupled to two-by-one photonic elements, and an outermost column 1190 of two-by-one switching elements. Notably, each of the intermediate switching stage 1130, 1170 includes four columns 1131-1134, 1171-1172 of two-by-two switching elements.

Figure 12:
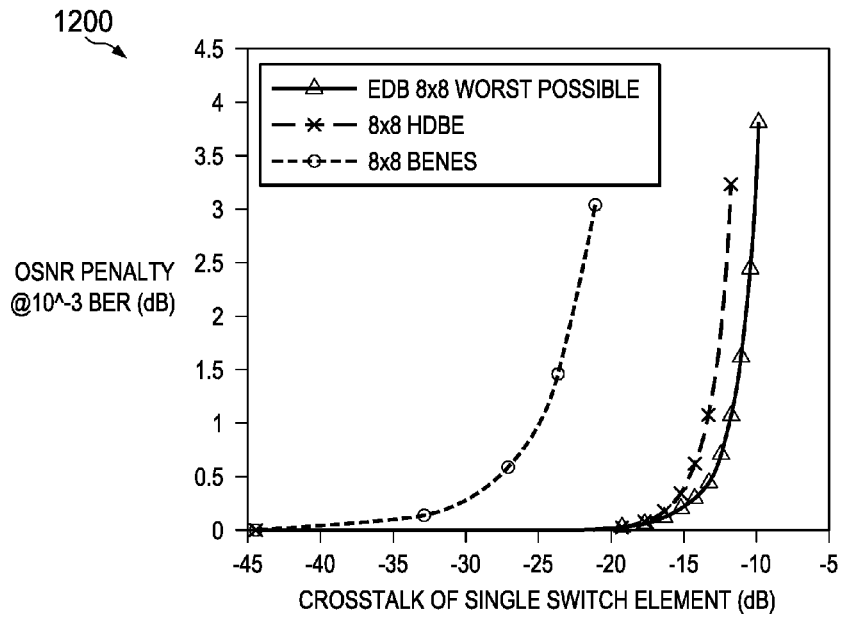
FIG. 12 illustrates a graph comparing optical signal-to-noise ratios (OSNRs) of different eight-by-eight switching fabric architectures.

The embodiment hybrid switching architectures provided by this disclosure provide SNR performance advantages over conventional Benes and dilated Benes architectures and a switching cell count advantage over Enhanced Dilated Banyan architectures. FIG. 12 illustrates a graph 1200 comparing the Optical Signal-To-Noise Ratio penalty of different eight-by-eight switching fabric architectures as a function of crosstalk in dB or Extinction Ration (ER). It is noted that extinction ER equals the absolute value of crosstalk. As shown, the hybrid dilated Benes architectures provided by this disclosure offer a much better cross-talk suppression than the comparable Benes architectures, which allows for greater scalability and more tolerance with respect to the cross-talk performance of the individual switching elements. The hybrid dilated Benes architectures provided by this disclosure may maintain a low OSNR penalty while using less expensive switching elements. For instance, for an acceptable OSNR penalty of 0.5 dB, the hybrid dilated Benes discussed by this disclosure can be designed using switching cells with extinction ratio of 15 dB, whereas, for the same OSNR penalty, the switching cells in Benes design should have an extinction ratio of at least 28 dB.

Figure 13:
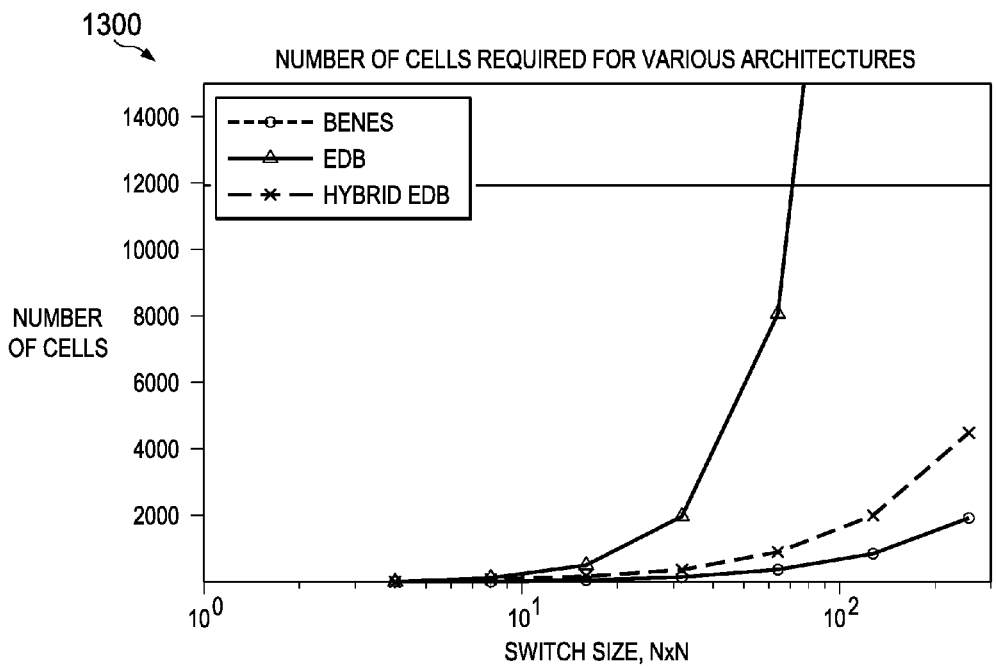
FIG. 13 illustrates a graph comparing cell counts of different eight-by-eight switching fabric architectures.
Figure 14:
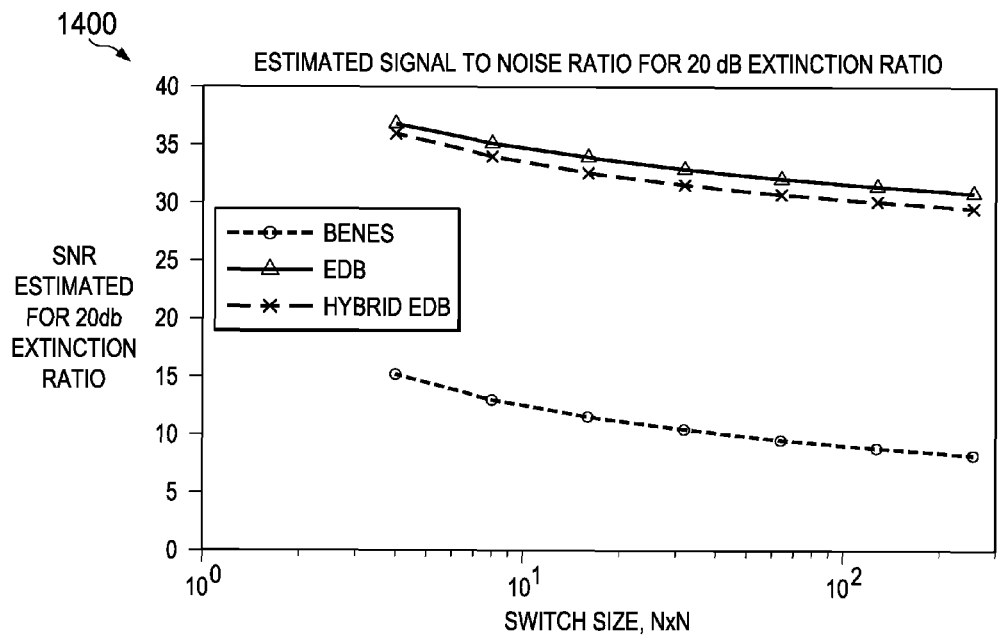
FIG. 14 illustrates a graph comparing signal-to-noise (SNR) ratios of different N×N switching fabric architectures.
Figure 15:
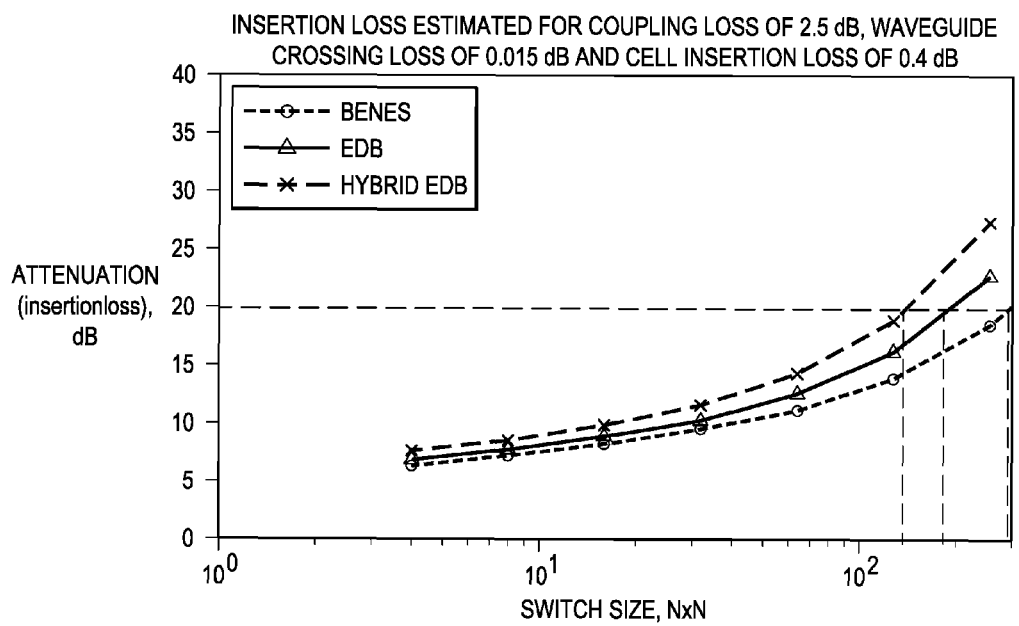
FIG. 15 illustrates a graph comparing attenuation rates of different N×N switching fabric architectures.

FIG. 13 illustrates a graph 1300 comparing the cell counts of different N×N switching fabric architectures. As shown, the hybrid dilated Benes architectures provided by this disclosure offer lower cell counts than comparable EDB architectures, which allows for greater scalability. FIG. 14 illustrates a graph 1400 comparing signal-to-noise (SNR) ratios of different N×N switching fabric architectures. As shown, the hybrid dilated Benes architectures provided by this disclosure offer better SNR performance than comparable Benes architectures when the extinction ratio of the switching elements is fixed at 20 decibels (dbs) while its SNR performance is close to that of EDB architectures. FIG. 15 illustrates a graph 1500 comparing attenuation rates of different N×N switching fabric architectures. As shown, the hybrid dilated Benes architectures provided by this disclosure is not penalized much in terms of attenuation loss. This is because attenuation loss is proportional to the number of stages.

Aspects of this disclosure provide embodiment jumpsuit switch architectures for next generation optical nodes. Embodiment jumpsuit switch architectures may include three stages with low intra-connectivity. Embodiment jumpsuit switch architectures may reduce connection blocking and include fewer numbers of crossings when compared to conventional optical node designs. Embodiment jumpsuit switch architectures may have relatively balanced transit connectivity and add/drop loss.

Figure 16A:
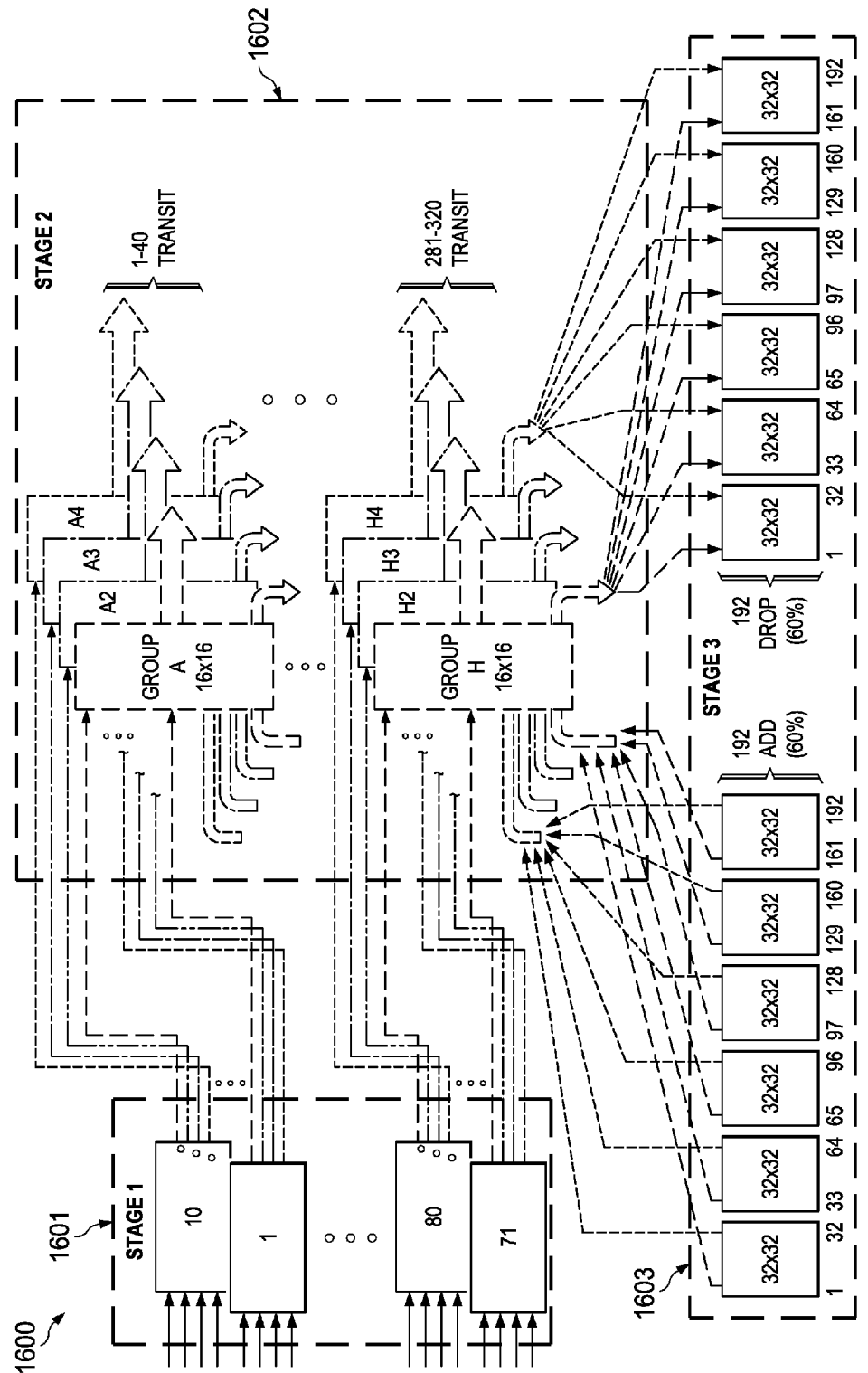
FIGS. 16A-16G illustrate diagrams of embodiment jumpsuit switch architectures.
Figure 16B:
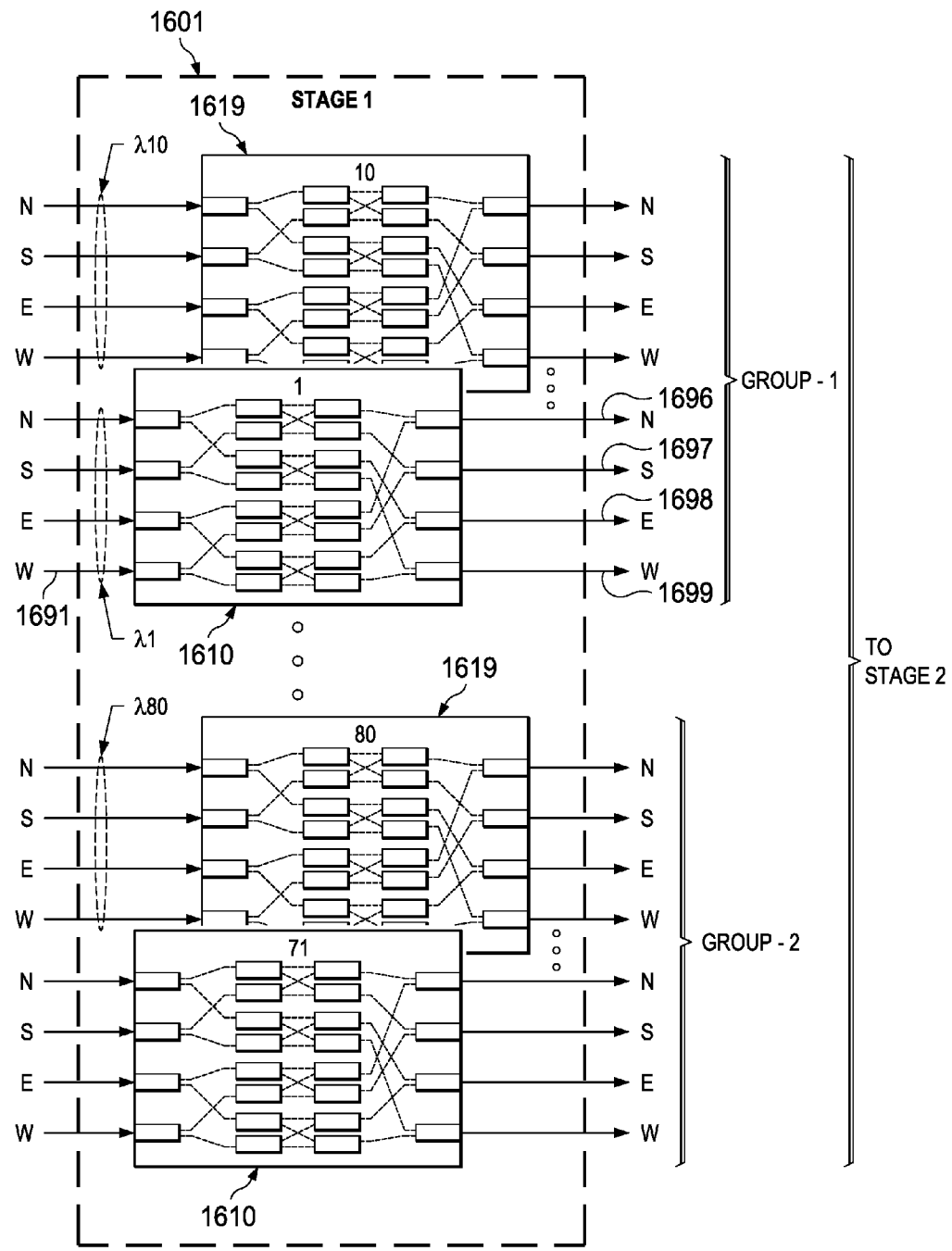
Figure 16C:
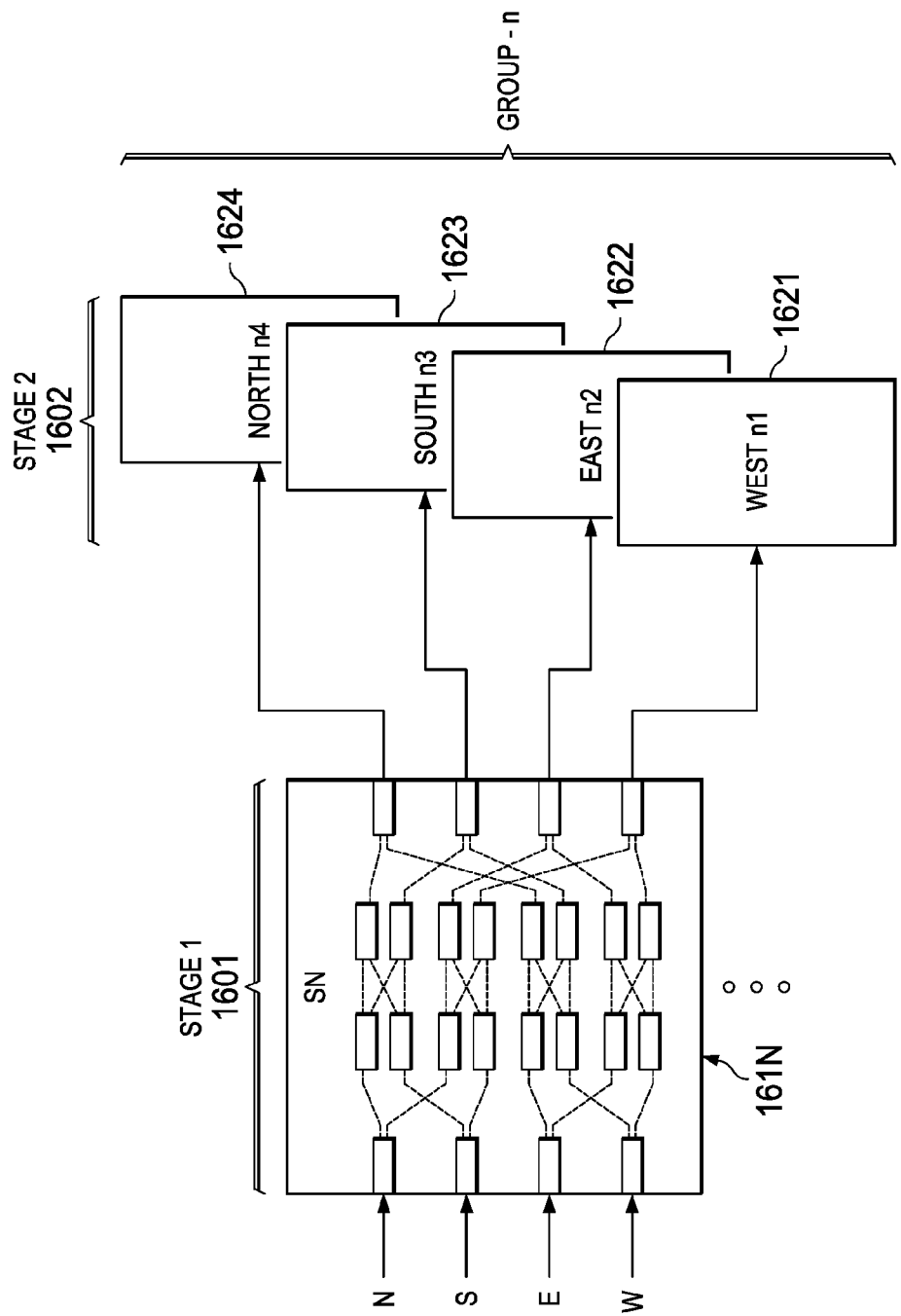
Figure 16D:
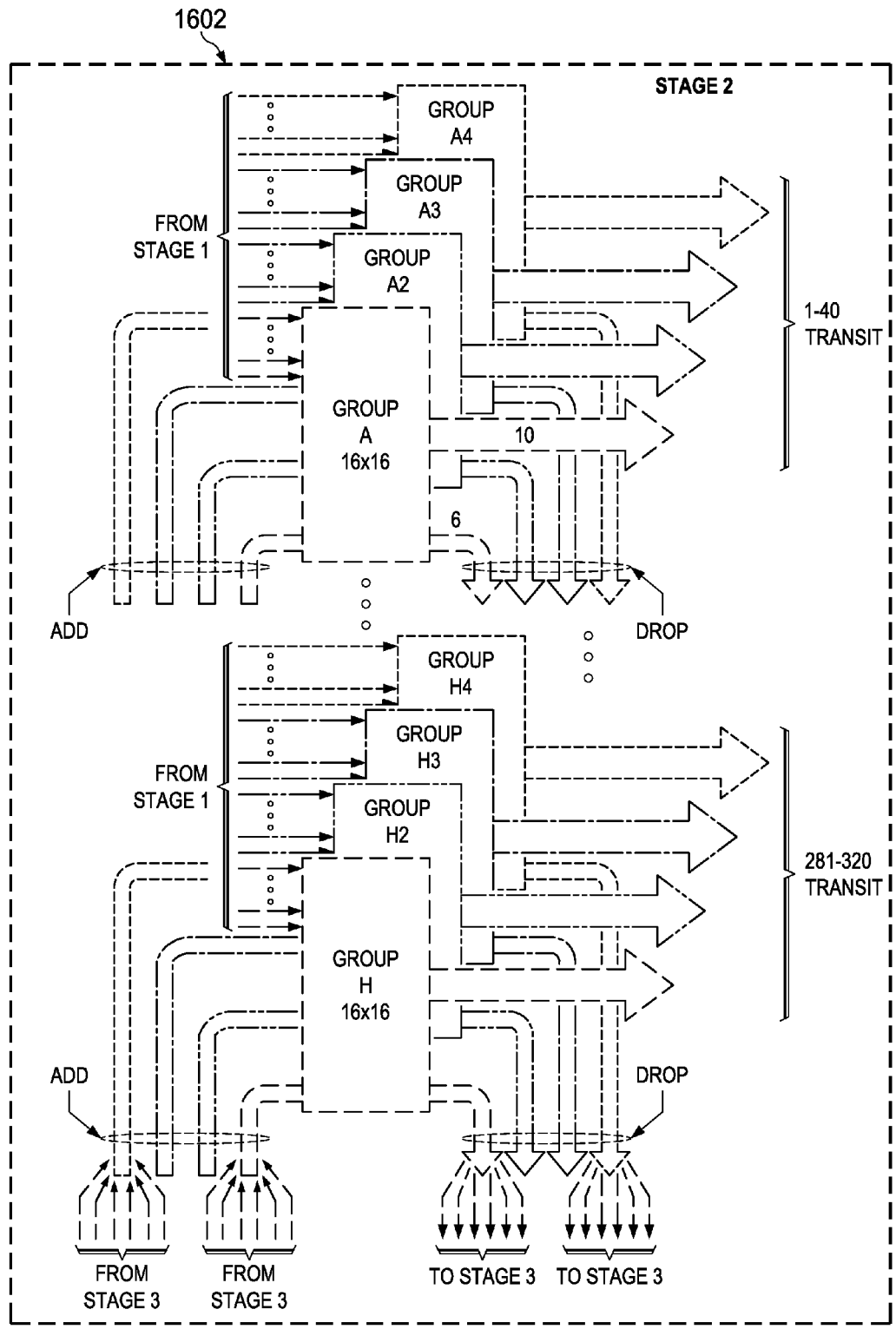
Figure 16E:
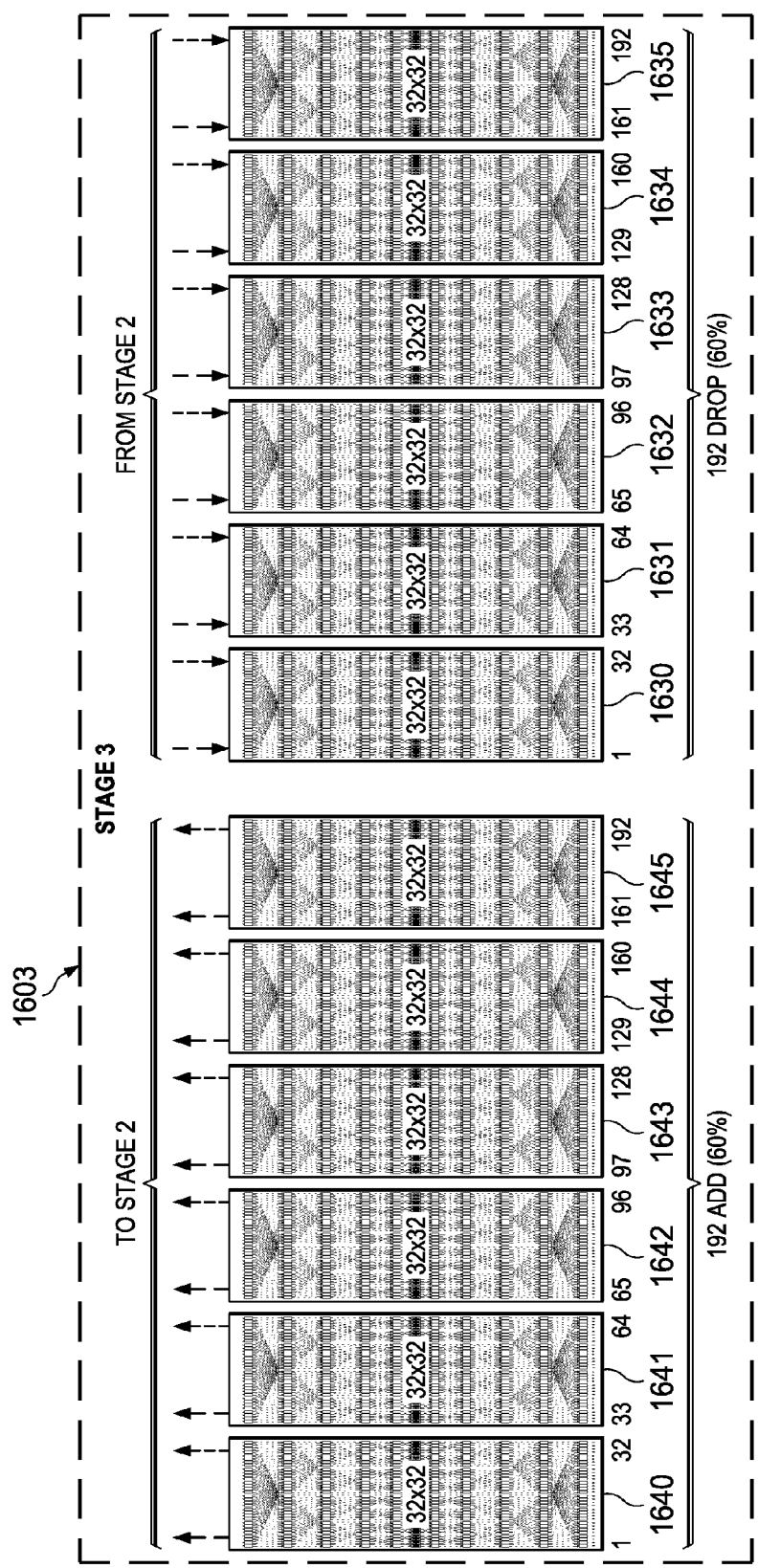
Figure 16F:
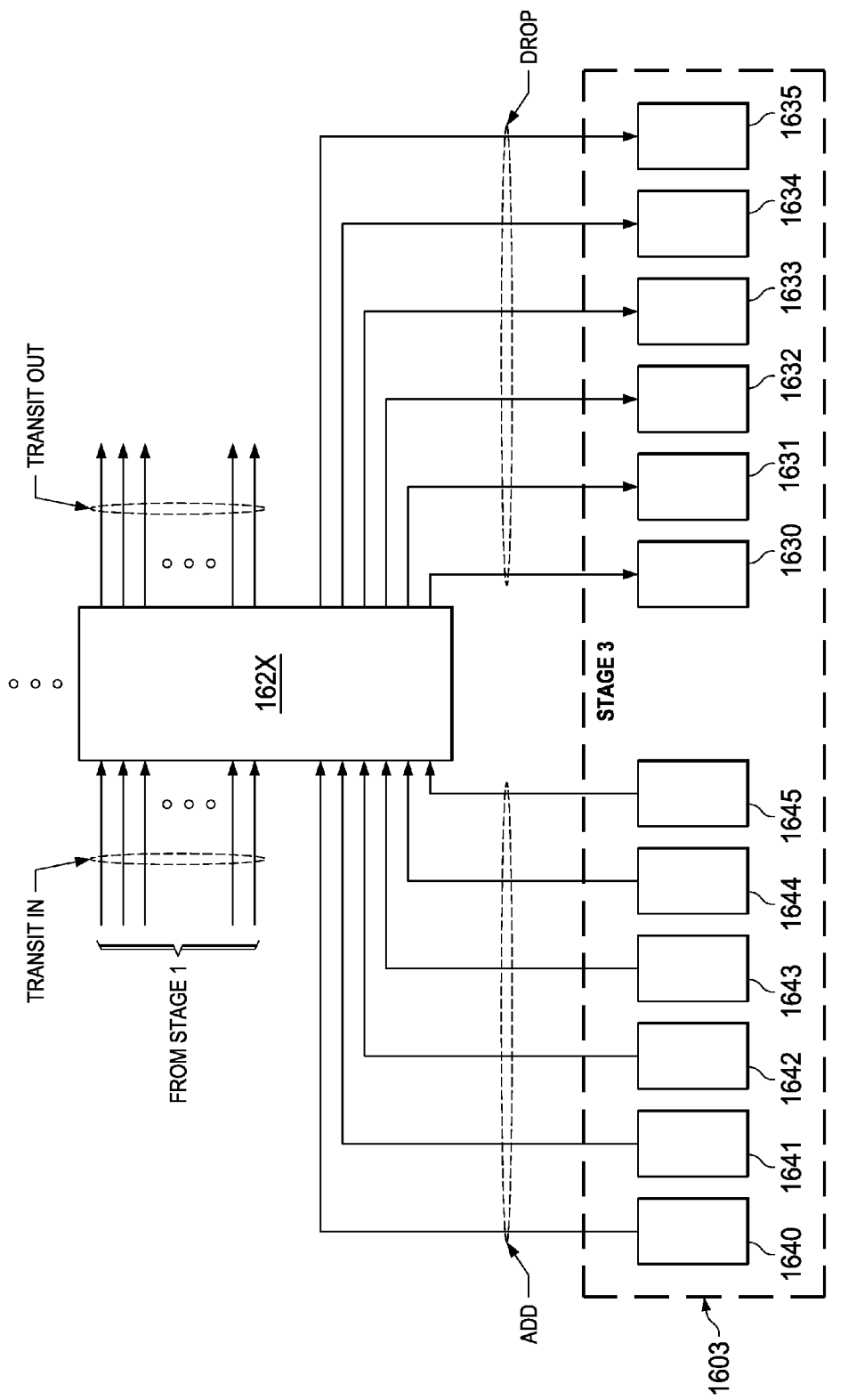

FIG. 16A illustrates a diagram of an embodiment jumpsuit switch architecture 1600. As shown, the embodiment jumpsuit switch architecture 1600 comprises a first stage 1601 for incoming optical signals, a second stage 1602 for outgoing optical signals, and a third stage 1603 for adding/dropping optical signals. In some embodiments, the first stage 1601 may perform load balancing for the second stage 1602 by distributing the dropped signals (e.g., signals ultimately funneled to the third stage 1603) over less congested switching fabrics in the second stage 1602. FIG. 16B illustrates the first stage 1601. As shown, the first stage 1601 includes switching fabrics 1610-1619 for each group of switching fabrics in the second stage. Each switch fabric 1610-1619 receives a different wavelength (e.g., $\lambda 1$, $\lambda 2$, . . . $\lambda 80$) from four different directions, e.g., North (N), South (S), East (E), and West (W), over its input ports, and distributes the received signals over its respective outputs ports. Each output port of a given one of the switch fabrics 1610-1619 is connected to a switching fabric in the second stage that is associated with a different outgoing transit direction. Transit signals (e.g., signals that pass through the node without being dropped/converted) are switched in the first stage 1601 on the basis of their outgoing direction. For example, an inbound signal (e.g., $\lambda 1$) received on the input port 1691 of the switch fabric 1610 that is destined for a next hop optical node positioned to the north will be forwarded to the second stage 1602 via the port 1696. Drop signals (e.g., signals that are dropped/converted at the third stage 1603) are switched in the first stage 1601 in a manner that provides load balancing for the second stage 1602. For example, an inbound signal (e.g., $\lambda 1$) received on the input port 1691 of the switch fabric 1610 that is destined to be dropped/converted may be forwarded to the stage two 1602 via any of the ports 1696-1699 depending on the level of congestion on the corresponding switching fabrics in the second stage 1602. For instance, the inbound signal (e.g., $\lambda 1$) may be forwarded over the port 1699 when the second stage switching fabric associated with the port has less congestion than the second stage switching fabrics associated with the ports 1696-1698. FIG. 16C illustrates an interconnection between a group of switching fabrics in the first stage 1601 and a group of switching fabrics in the second stage 1602. FIG. 16D illustrates the second stage 1602 which may comprise a hybrid dilated Benes architecture. As shown, the switching fabrics in the second stage 1602 receive inbound signals from the first stage 1601 and added signals (e.g., new signals) from the third stage 1603. The inbound signals are switched over the transit ports and drop ports based on the signals destination. The added signals are switched over the transit ports based on the signals destination. FIG. 16E illustrates the third stage 1603 which may comprise a hybrid dilated Benes architecture. FIG. 16F illustrates an interconnection between a switching fabric in the second stage 1602 and switching fabrics in the third stage 1603. In some embodiments, one or more additional stages may be added before the first stage 1601 to achieve load balancing over the preceding stage (e.g., the first stage 1601 or an intermediate stage between the instance stage and the first stage 1601). The jumpsuit switch architecture depicted in FIGS. 16A-16F is merely one example of many possible optical node configurations. Embodiment jumpsuit switch architectures provided by this disclosure can be adapted to any optical node configuration, e.g., different numbers of input directions, different numbers of output directions, different numbers of optical signals, different numbers of stages, different ratios of add/drop to transit ports, etc.

Figure 16G:
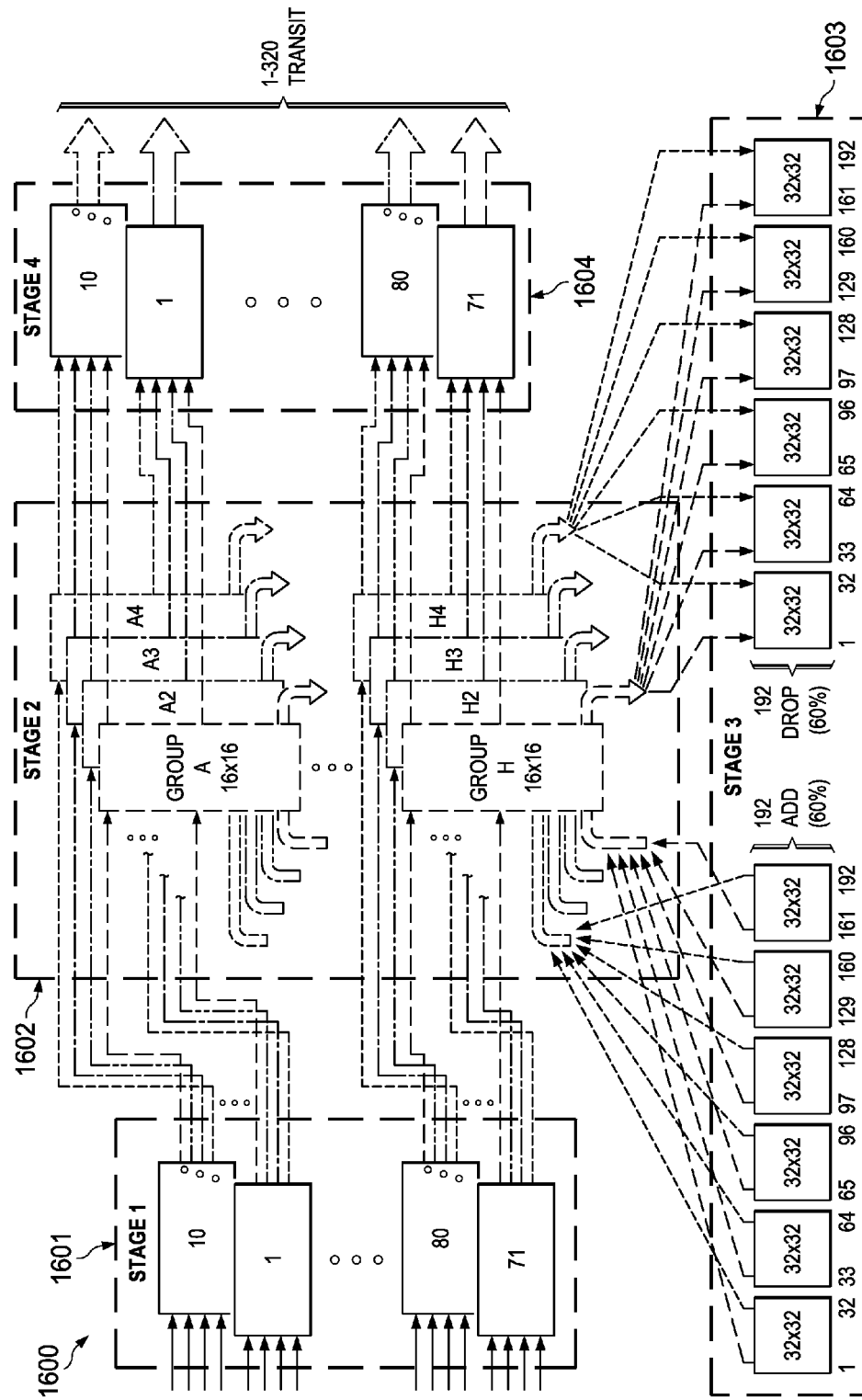

In some embodiments, a fourth stage of optical switching fabrics can be introduced into the jumpsuit switch architecture to achieve improved load balancing. FIG. 16G illustrates the embodiment jumpsuit switch architecture 1600 comprising a fourth stage 1604. Notably, the fourth stage 1604 may enable enhanced load balancing of the second stage 1602 by allowing the first stage 1601 to load balance transit signals, as well as by allowing the third stage 1603 to load balance added signals. In some embodiments, the second stage 1602 may be used to load balance the fourth stage 1604. In an embodiment, the fourth stage 1604 may be configured similarly to the first stage 1601. Other configurations are also possible. In other variants, supplemental stages may introduced between the second stage 1602 and the third stage 1603 to allow for load balancing of added optical signals.

Figure 17:
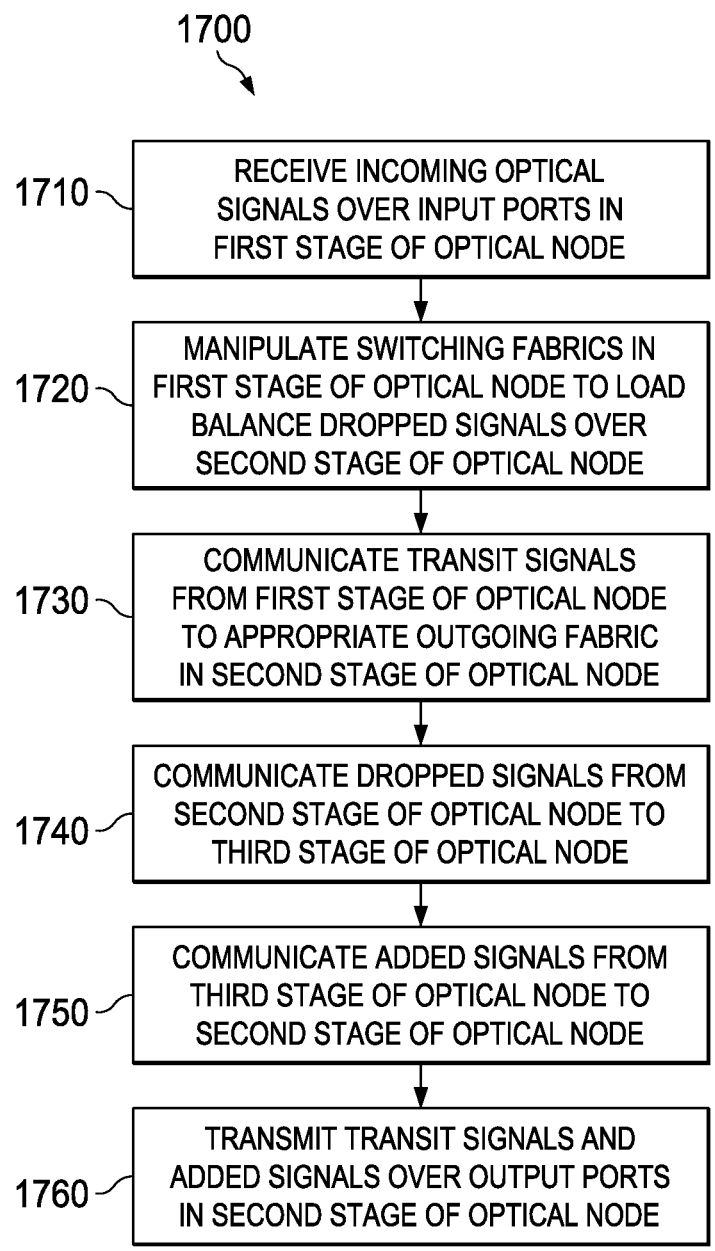
FIG. 17 illustrates a flowchart of an embodiment method for operating an optical node configured with a jumpsuit switch architecture.

FIG. 17 illustrates a flowchart of an embodiment method 1700 for operating an optical node configured with a jumpsuit switch architecture to achieve load-balancing over switching fabrics of the optical node. As shown, the method 1700 begins with step 1710, where incoming optical signals are received over input ports of a first stage of switching fabrics in the optical node. Next, the method 1700 proceeds to step 1720, where switching fabrics in first stage of optical node are manipulated to load balance dropped signals over second stage of optical node. Subsequently, the method 1700 proceeds to step 1730, where transit signals (e.g., pass-through signals) are communicated from first stage of optical node to appropriate outgoing fabric in second stage of optical node. Next, the method 1700 proceeds to step 1740, where dropped signals (e.g., signals destined to be dropped/converted) are communicated from the second stage of optical node to third stage of optical node. Subsequently, the method 1700 proceeds to step 1750, where added signals are communicated from third stage of optical node to second stage of optical node. Finally, the method 1700 proceeds to step 1760, where the transit signals and the added signals over communicated over output ports in second stage of optical node. Notably, the steps 1710-1760 are typically performed simultaneously by the optical node, as signals are constantly being received, added/converted, and transmitted by the optical node.

Figure 18:
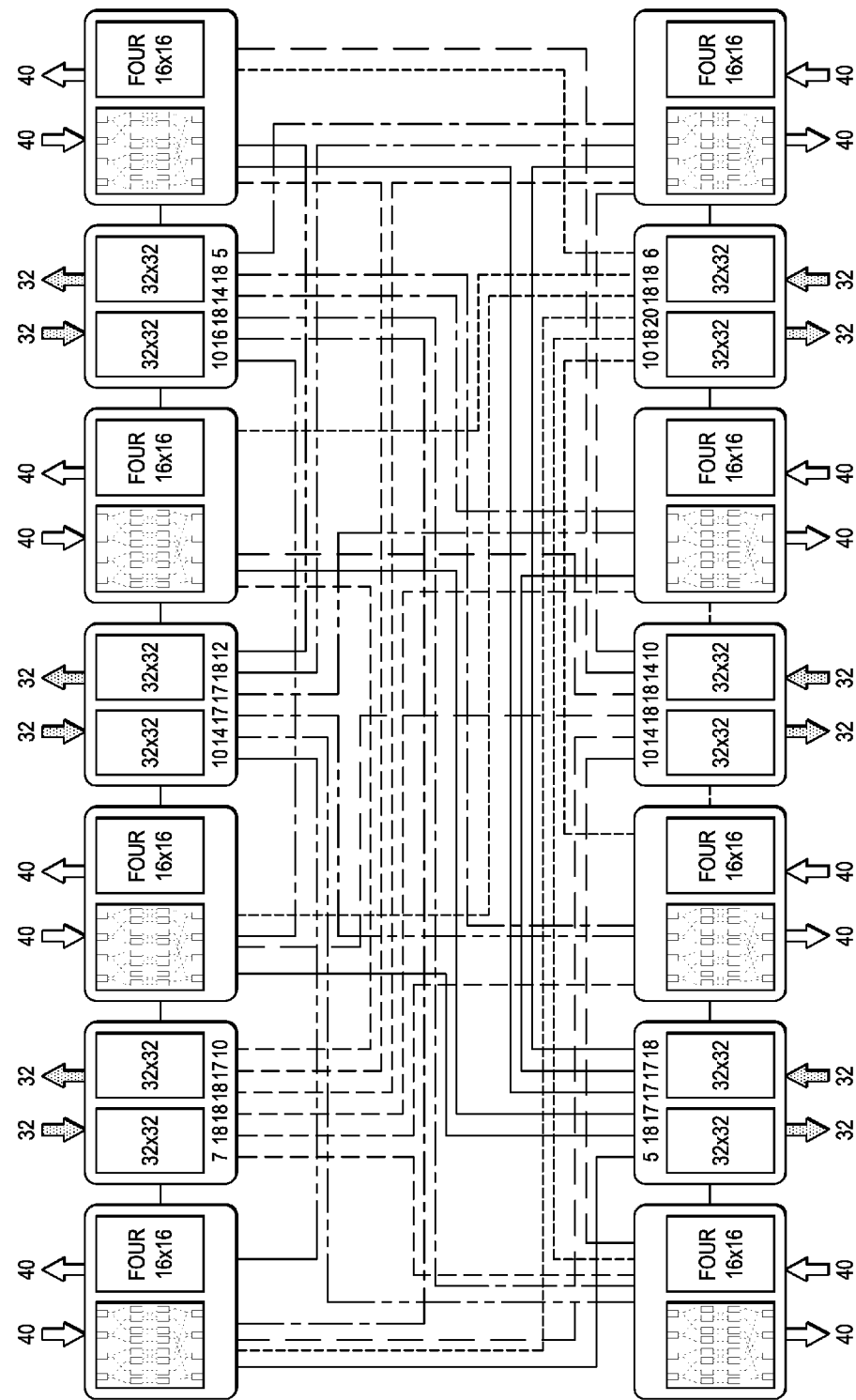
FIG. 18 illustrates a diagram of an embodiment layout for a jumpsuit switch architecture.
Figure 19:
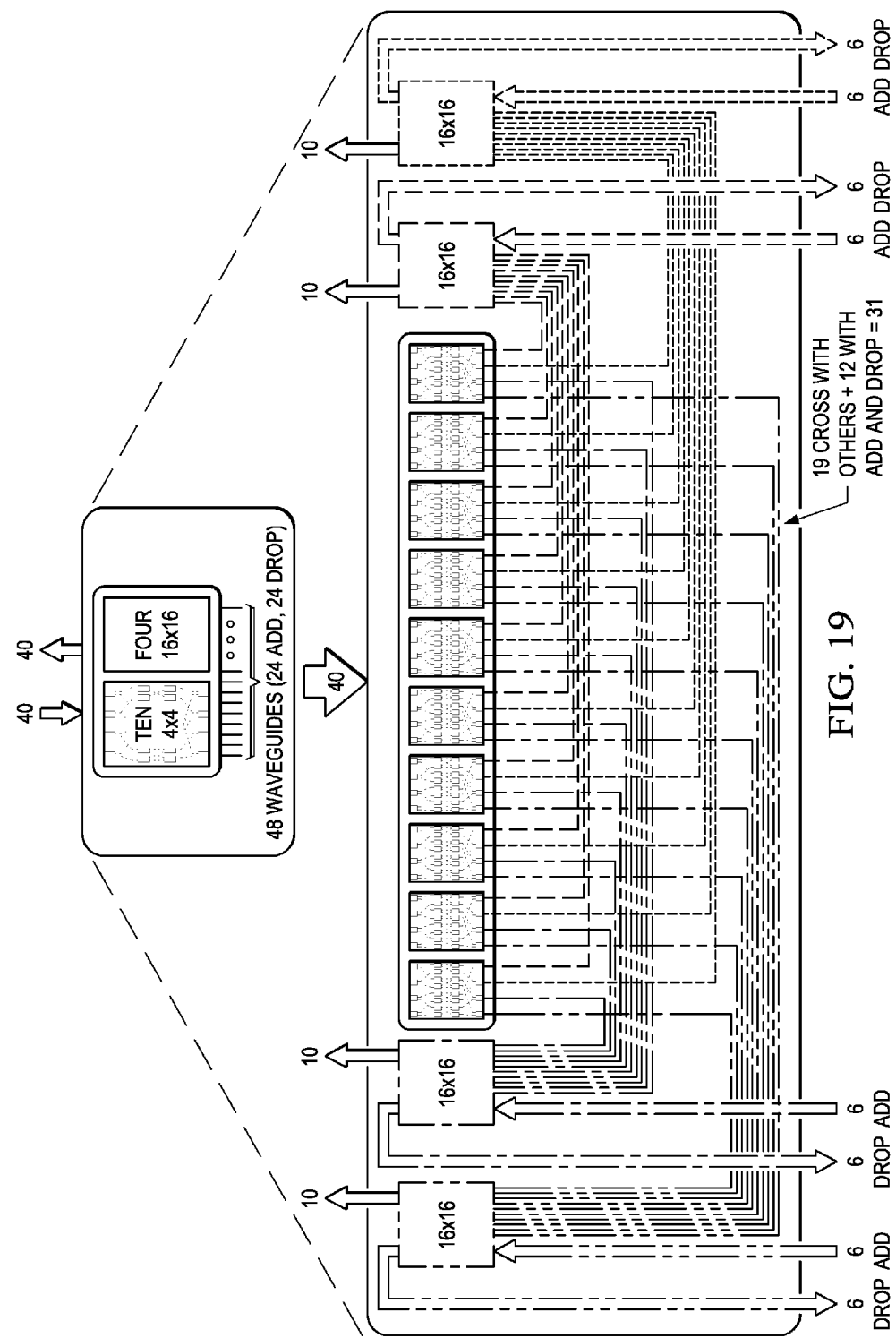
FIG. 19 illustrates a diagram of an embodiment layout for stages one and two of a jumpsuit switch architecture.
Figure 20:
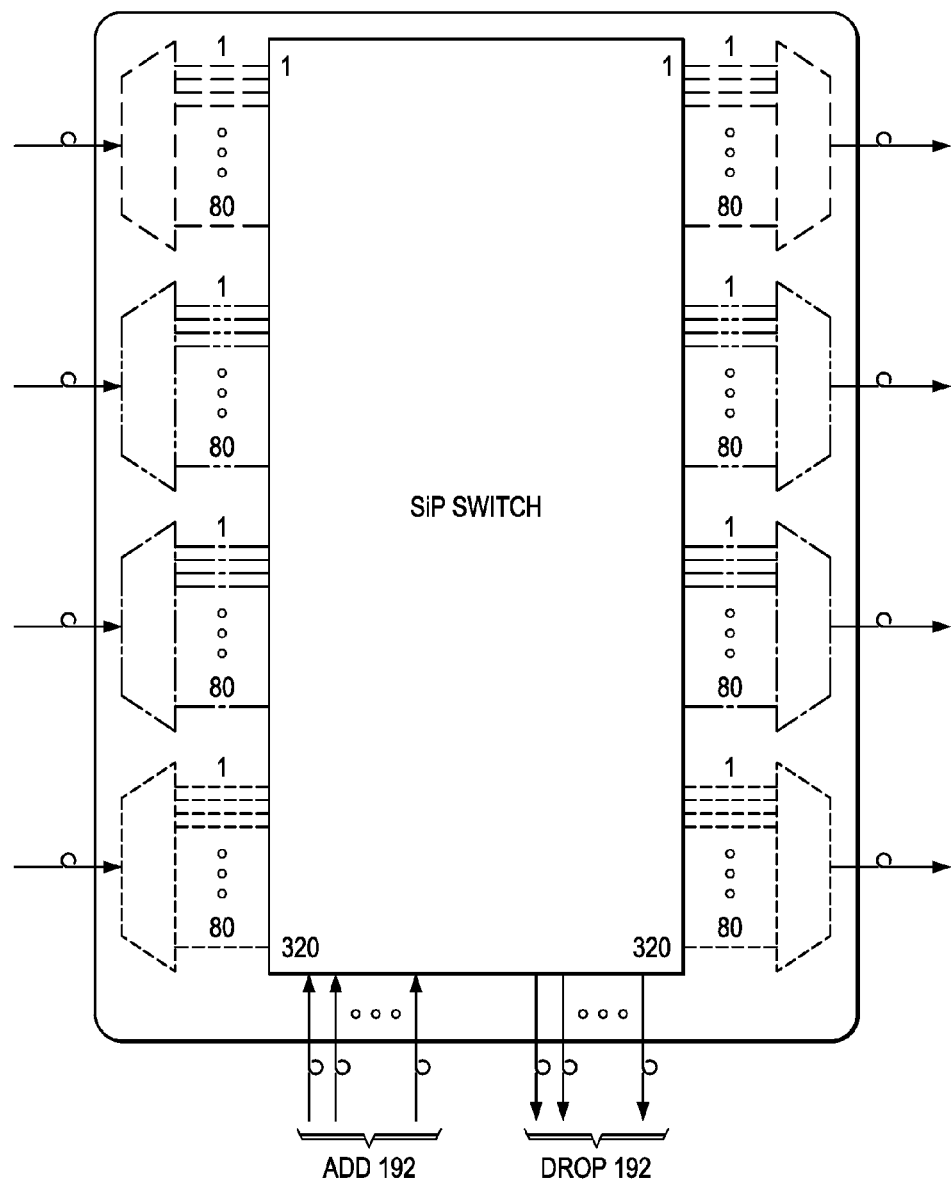
FIG. 20 illustrates a diagram of an embodiment system in package (SiP) chip for a jumpsuit switch architecture.
Figure 21:
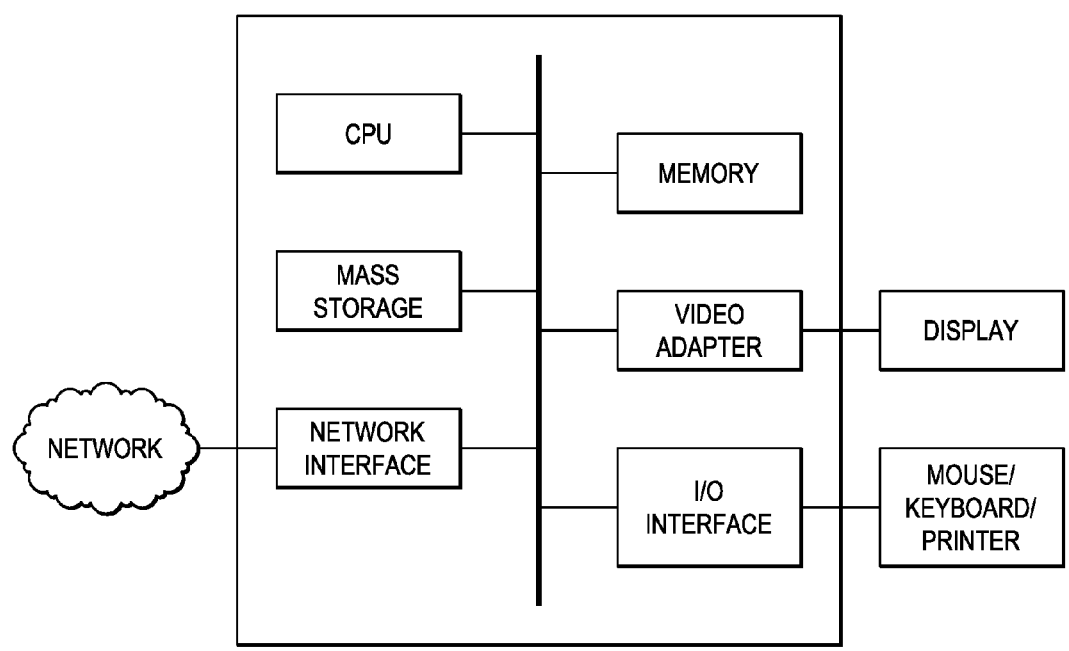
FIG. 21 illustrates a diagram of an embodiment computing platform.

As described above, hybrid dilated Benes can achieve low cell count with adequate SNR performance, making it scalable for next-generation optical nodes. FIG. 18 illustrates a diagram of an embodiment layout for an embodiment jumpsuit switch architecture. Each group of stage 1 connects to one group of stage 2. This grouping, for instance, means that a combined group of stager and 2 can handle 40 wavelengths; thus, all 320 wavelengths from 4 directions can be handled with 8 combined groups. Each combined group is connected to all six add/drop fabrics. The number on a given link represents the number of waveguide crossing due to the connectivity of the groups. This number allows calculation of attenuation loss due to waveguide crossing. FIG. 19 illustrates a diagram of an embodiment layout for stages one and two of an embodiment jumpsuit switch architecture. FIG. 20 illustrates a diagram of an embodiment Silicon Photonic (SiP) chip for an embodiment jumpsuit switch architecture FIG. 21 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be the switching fabric architecture discussed in the embodiment or one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A switching fabric comprising:
a plurality of ports including input ports and output ports; and
a plurality of photonic elements coupled in-between the input ports and the output ports, the plurality of photonic elements for switching signals between the input ports and the output ports, wherein the plurality of photonic elements are arranged into an architecture that includes a first outer-most switching column comprising rows of one-by-two (1×2) photonic elements coupled to the input ports, a second outermost column comprising rows of two-by-one (2×1) photonic elements coupled to the output ports, two intermediate switching stages each of which including at least one column comprising rows of two-by-two (2×2) switching elements, and a central switching column comprising rows of one-by-two (1×2) photonic elements coupled to two-by-one (2×1) photonic elements.

2. The switching fabric of claim 1, wherein the two intermediate switching stages are positioned in-between the outermost switching columns, and wherein the central switching column is positioned in-between the two intermediate switching stages.

3. The switching fabric of claim 1, wherein the two intermediate switching stages comprises:
   a first intermediate switching stage positioned in-between the first outermost column and the central switching column; and
   a second intermediate switching stage positioned in-between the second outermost column and the central switching column.

4. The switching fabric of claim 3, wherein the at least one column of 2×2 switching elements in the first intermediate switching stage interconnect the 1×2 photonic elements in the first outermost column with the 1×2 photonic elements in the central switching column.

5. The switching fabric of claim 4, wherein the at least one column of 2×2 switching elements in the second intermediate switching stage interconnect the 2×1 photonic elements in the central switching column with the 2×1 photonic elements in the second outermost column.

6. The switching fabric of claim 5, wherein the rows of 1×2 photonic elements coupled to 2×1 photonic elements in the central switching column interconnect 2×2 photonic elements in an inner-most column of the first intermediate switching stage with 2×2 photonic elements in an inner-most column of the second intermediate switching stage.

7. The switching fabric of claim 5, wherein the switching fabric is implemented in a second stage of a switch architecture of an optical network node, the switch architecture comprising a first stage for incoming optical signals, the second stage for outgoing optical signals, and a third stage for adding or dropping optical signals.

8. The switching fabric of claim 5, wherein the switching fabric is implemented in a third stage of a switch architecture of an optical network node, the switch architecture comprising a first stage for incoming optical signals, a second stage for outgoing optical signals, and the third stage for adding or dropping optical signals.

9. The switching fabric of claim 7, wherein the first stage performs load balancing for the second stage.

10. A switching fabric comprising:
    a first number of input ports (N input ports);
    a first number of output ports (N output ports); and
    a plurality of photonic elements coupled in-between the N input ports and the N output ports, the plurality of photonic elements being arranged into a photonic switching architecture for switching between the N input ports and the N output ports, wherein the photonic switching architecture includes a first outer-most switching column comprising N rows of one-by-two (1×2) photonic elements coupled to the N input ports, a second outermost column comprising N rows of two-by-one (2×1) photonic elements coupled to the N output ports, two intermediate switching stages each of which including at least one column comprising N rows of two-by-two (2×2) switching elements, and a central switching column comprising N×2 rows of one-by-two (1×2) photonic elements coupled to two-by-one (2×1) photonic elements.

11. The switching fabric of claim 10, wherein the two intermediate switching stages are positioned in-between the outermost switching columns, and wherein the central switching column is positioned in-between the two intermediate switching stages.

12. The switching fabric of claim 10, wherein the two intermediate switching stages comprises:
    a first intermediate switching stage positioned in-between the first outermost column and the central switching column; and
    a second intermediate switching stage positioned in-between the second outermost column and the central switching column.

13. The switching fabric of claim 12, wherein the at least one column of 2×2 switching elements in the first intermediate switching stage interconnect the 1×2 photonic elements in the first outermost column with the 1×2 photonic elements in the central switching column.

14. The switching fabric of claim 13, wherein the at least one column of 2×2 switching elements in the second intermediate switching stage interconnect the 2×1 photonic elements in the central switching column with the 2×1 photonic elements in the second outermost column.

15. The switching fabric of claim 13, wherein the N×2 rows of 1×2 photonic elements coupled to 2×1 photonic elements in the central switching column interconnect 2×2 photonic elements in an inner-most column of the first intermediate switching stage with 2×2 photonic elements in an inner-most column of the second intermediate switching stage.

16. The switching fabric of claim 13, wherein the switching fabric is implemented in a second stage of a switch architecture of an optical network node, the switch architecture comprising a first stage for incoming optical signals, the second stage for outgoing optical signals, and a third stage for adding or dropping optical signals.

17. The switching fabric of claim 13, wherein the switching fabric is implemented in a third stage of a switch architecture of an optical network node, the switch architecture comprising a first stage for incoming optical signals, and second stage for outgoing optical signals, and the third stage for adding or dropping optical signals.

18. An apparatus comprising:
    a photonic switching architecture for switching data between input ports and output ports, the photonic switching architecture including a first outer-most switching column comprising N rows of one-by-two (1×2) photonic elements coupled to the N input ports, a second outermost column comprising N rows of two-by-one (2×1) photonic elements coupled to the N output ports, two intermediate switching stages each of which including at least one column comprising N rows of two-by-two (2×2) switching elements, and a central switching column comprising N×2 rows of one-by-two (1×2) photonic elements coupled to two-by-one (2×1) photonic elements.

19. The apparatus of claim 18, wherein the two intermediate switching stages are positioned in-between the outermost switching columns, and wherein the central switching column is positioned in-between the two intermediate switching stages.

20. The switching fabric of claim 18, wherein the two intermediate switching stages comprises:

a first intermediate switching stage positioned in-between the first outermost column and the central switching column; and a second intermediate switching stage positioned in-between the second outermost column and the central switching column.

* * * * *